United States Patent
Butler et al.

(10) Patent No.: US 9,327,550 B2
(45) Date of Patent: May 3, 2016

(54) AERODYNAMIC WHEEL COVERS AND MOUNTING ASSEMBLIES

(75) Inventors: Joshua Butler, Austin, TX (US); Kyle Walker, Austin, TX (US)

(73) Assignee: FlowBelow Aero, Inc., Austin, TX (US)

( * ) Notice: Subject to any disclaimer, the term of this patent is extended or adjusted under 35 U.S.C. 154(b) by 685 days.

(21) Appl. No.: 13/545,100

(22) Filed: Jul. 10, 2012

(65) Prior Publication Data
US 2013/0015698 A1    Jan. 17, 2013

Related U.S. Application Data

(60) Provisional application No. 61/507,040, filed on Jul. 12, 2011.

(51) Int. Cl.
*B60B 7/00*    (2006.01)
*B60B 7/06*    (2006.01)

(52) U.S. Cl.
CPC ............... *B60B 7/0013* (2013.01); *B60B 7/06* (2013.01); *B60B 7/066* (2013.01); *B60B 2900/113* (2013.01); *B60B 2900/1216* (2013.01); *B60B 2900/531* (2013.01); *B60B 2900/541* (2013.01); *B60B 2900/572* (2013.01); *B60Y 2200/14* (2013.01); *B60Y 2200/142* (2013.01)

(58) Field of Classification Search
CPC .......... B60B 7/00; B60B 7/0066; B60B 7/04; B60B 7/06; B60B 7/061; B60B 7/066; B60B 7/068
USPC ............... 301/37.101, 37.102, 37.34, 37.371, 301/37.106, 37.376
See application file for complete search history.

(56) References Cited

U.S. PATENT DOCUMENTS

| | | | |
|---|---|---|---|
| 2,869,929 | A | 1/1959 | Hurd |
| 3,078,124 | A | 2/1963 | Mulder |
| 3,092,420 | A | 6/1963 | Baldwin et al. |
| 3,317,247 | A | 5/1967 | Lamme |
| 3,367,722 | A | 2/1968 | Miyanaga |
| 3,585,824 | A | 6/1971 | Schenk et al. |
| 3,918,764 | A | 11/1975 | Lamme |
| 4,730,952 | A | 3/1988 | Wiley |
| 4,761,040 | A | 8/1988 | Johnson |
| 4,974,909 | A | 12/1990 | Patti et al. |
| 4,984,851 | A | 1/1991 | Hayano |
| 5,263,770 | A | 11/1993 | Goudey |
| 5,294,189 | A | 3/1994 | Price et al. |
| 5,871,335 | A | 2/1999 | Bartlett |
| 6,045,195 | A | 4/2000 | Okamoto |
| 6,120,104 | A | 9/2000 | Okamoto et al. |
| 6,857,709 | B1 | 2/2005 | McLean et al. |
| 7,081,081 | B2 | 7/2006 | Schütz et al. |
| 7,484,736 | B2 | 2/2009 | Allemann et al. |

(Continued)

OTHER PUBLICATIONS

International Preliminary Report on Patentability (Ch. I) for PCT Application No. PCT/US2012/046010, mailed Jan. 23, 2014, 9 pgs.
International Search Report and Written Opinion for International Patent Application No. PCT/US13/68119, mailed Jun. 5, 2014, 10 pgs.
International Search Report and Written Opinion issued for PCT Application No. PCT/US2012/046010, completed Sep. 11, 2012 and mailed Oct. 1, 2012, 10 pages.
Extended European Search Report for Patent Application No. EP 12811575, dated Mar. 4, 2015, 8 pgs.

*Primary Examiner* — Jason Bellinger
(74) *Attorney, Agent, or Firm* — Sprinkle IP Law Group

(57) ABSTRACT

Aerodynamic wheel covers may include a hub assembly coupled with a hub of a large vehicle, such as a truck. A base assembly may be coupled to the hub assembly, and a disk assembly may be coupled with the base assembly such that removal and installation of the disk assembly may be accomplished without tools.

23 Claims, 20 Drawing Sheets

(56) References Cited

U.S. PATENT DOCUMENTS

| | | |
|---|---|---|
| 7,547,076 B2 | 6/2009 | Necaise |
| 7,988,239 B1 * | 8/2011 | Baker ........................ 301/37.25 |
| 8,011,848 B2 | 9/2011 | Sockman et al. |
| 2011/0089748 A1 | 4/2011 | Grill et al. |
| 2014/0265533 A1 * | 9/2014 | Polka ........................ 301/37.102 |

* cited by examiner

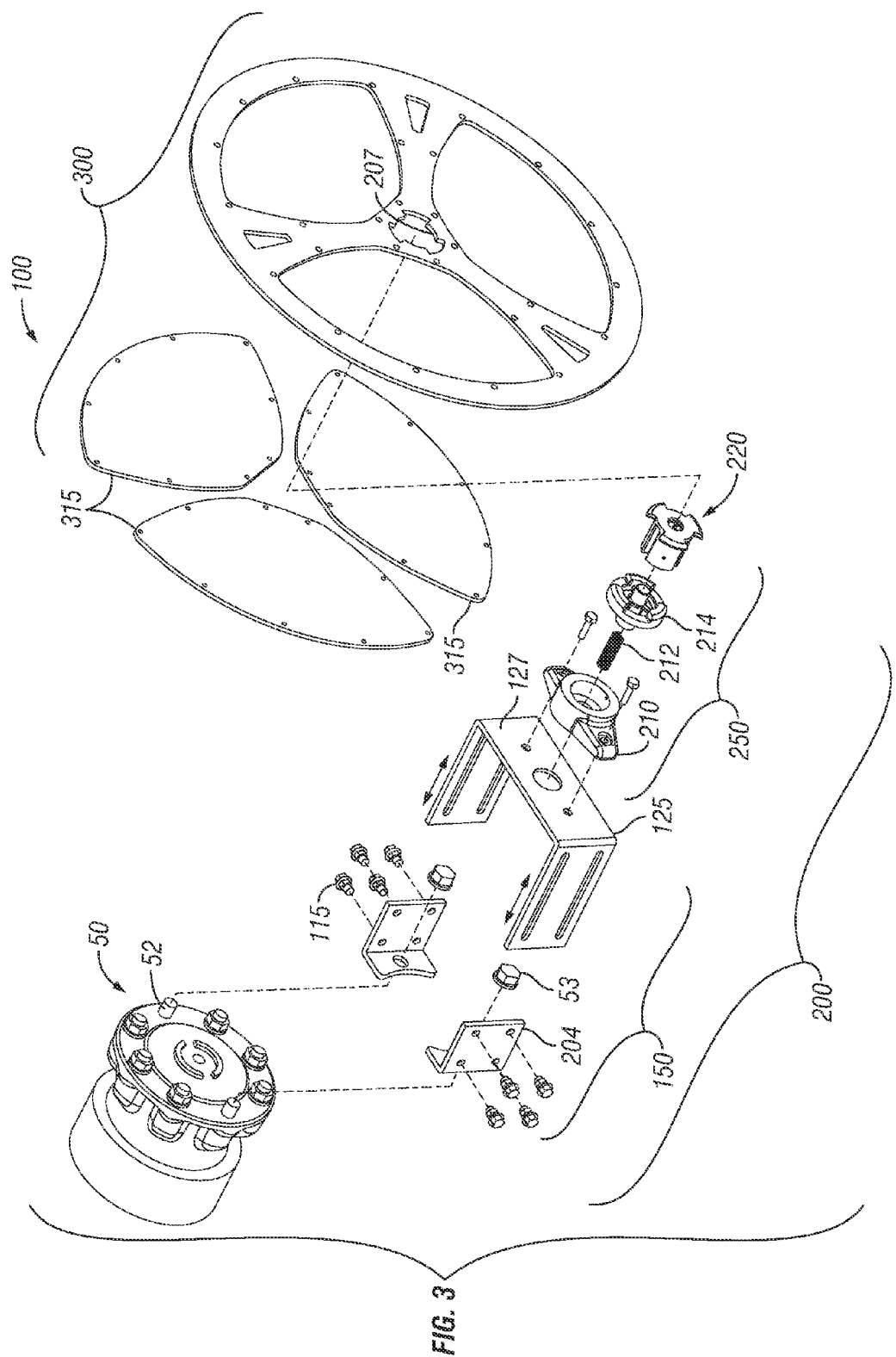

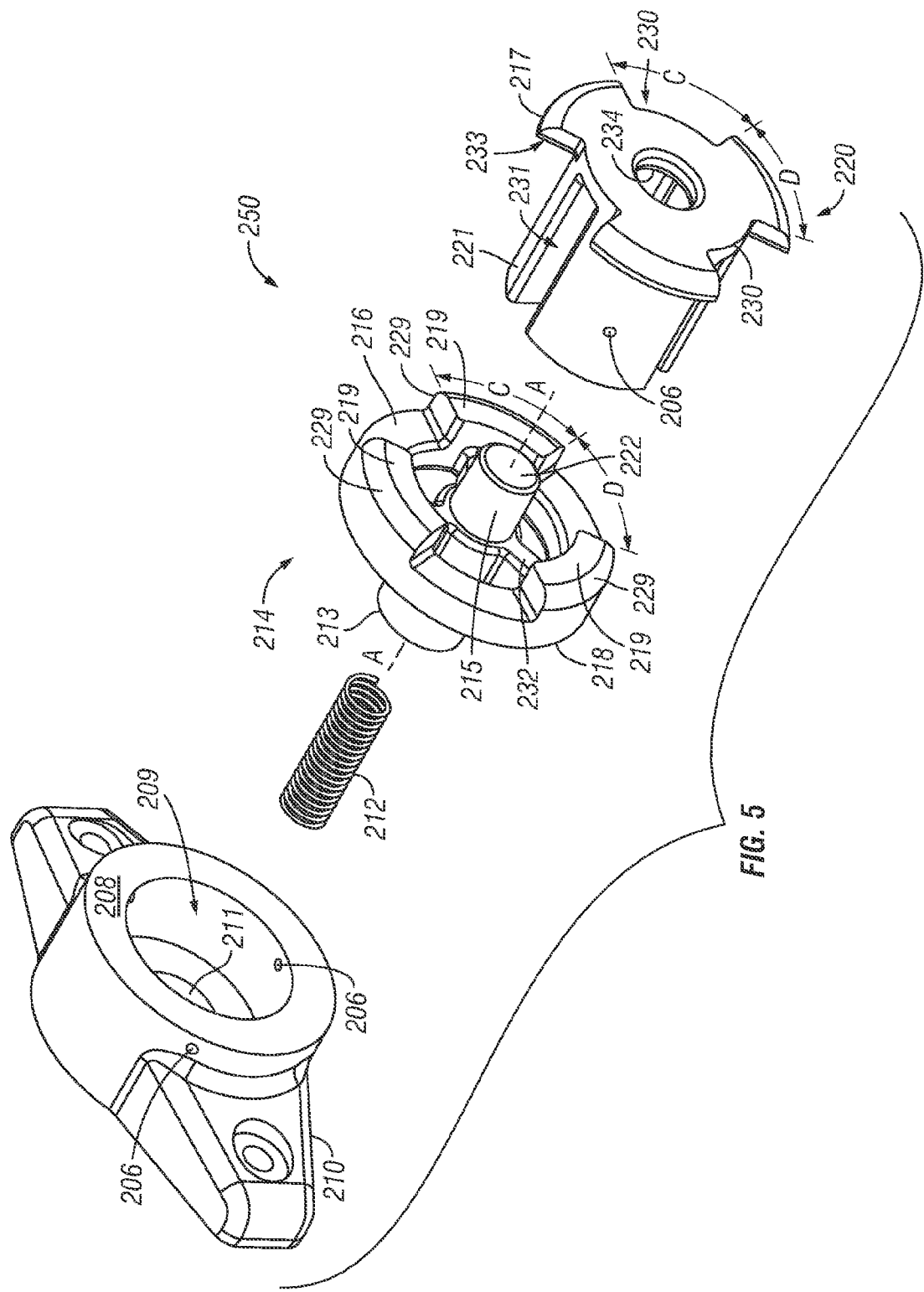

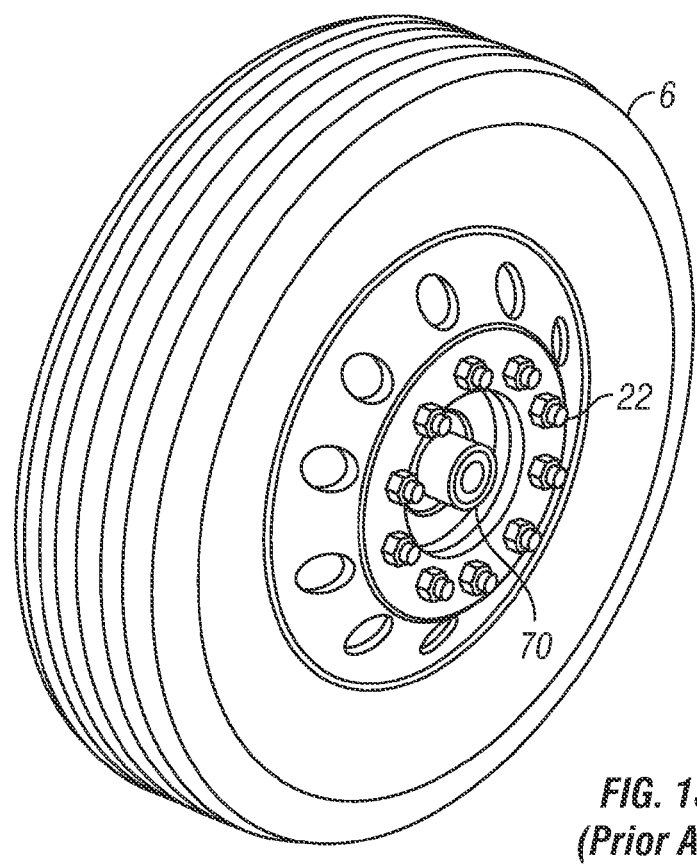
FIG. 13
(Prior Art)
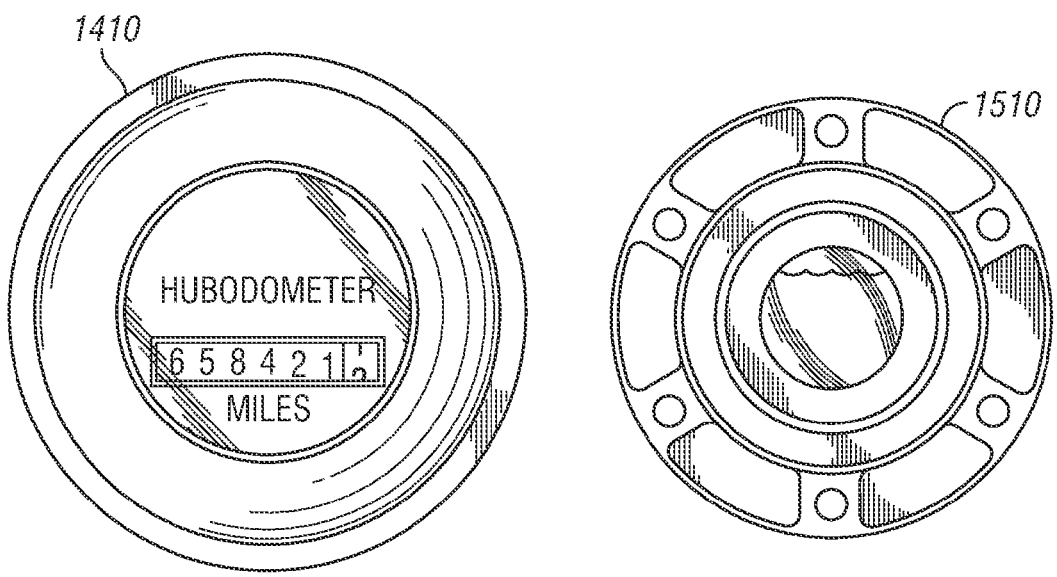
FIG. 14
(Prior Art)
FIG. 15
(Prior Art)

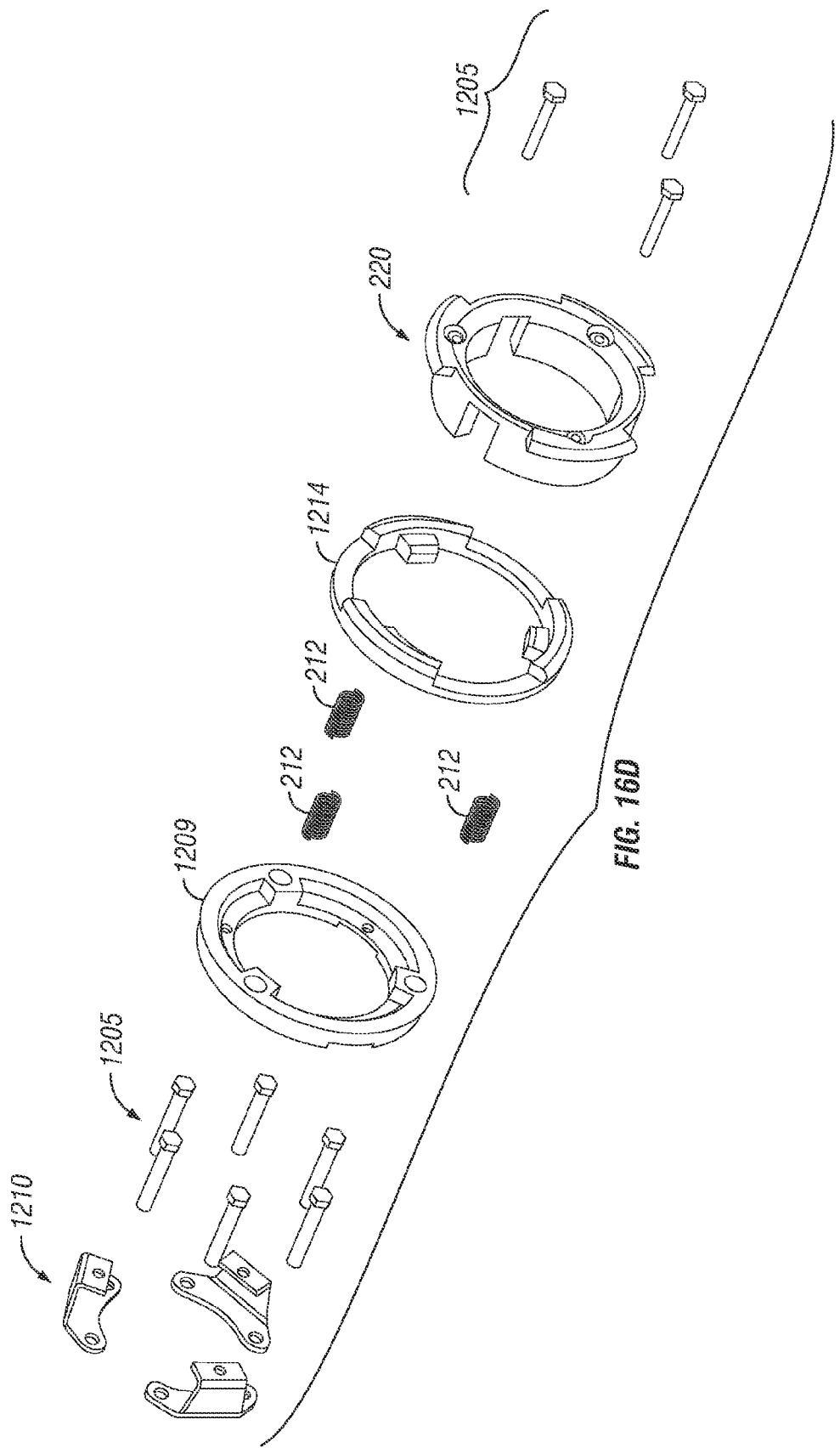

AERODYNAMIC WHEEL COVERS AND MOUNTING ASSEMBLIES

RELATED APPLICATIONS

This application claims a benefit of priority to the filing date of U.S. Provisional Patent Application Serial No. 61/507,040 by Joshua Butler and Kyle Walker, entitled "Aerodynamic Wheel Covers and Mounting Assemblies" filed on Jul. 12, 2011, which is fully incorporated herein by reference for all purposes.

TECHNICAL FIELD

This invention relates to methods of constructing and affixing aerodynamic wheel covers to the wheels of land vehicles, especially heavy trucks, whereby the wheel covers have improved maintenance, operation, functionality, cost-effectiveness, appearance, aerodynamics and fuel efficiency.

BACKGROUND

Wheel covers are common on cars, in part because the wheel rims provide a reliable mechanism for attachment and in part because car owners generally do not need to frequently access the lug nuts or other components covered by a hub cap.

In contrast, wheel covers for large vehicles such as semis are rarely used. Neither dual-wheels nor single-wide wheels are configured so that a wheel cover can be snapped into engagement as in the case with many passenger car wheel/wheel disk arrangements. Instead, dual wheels and single-wide wheels, especially on tractor-trailer vehicles and other large vehicles, are characterized by the substantial depth from the plane of the outer wheel rim inward to the region of the wheel hub where the wheel is attached to a brake drum, axle rotor, additional wheel or the like. This characteristic makes it difficult to secure a wheel cover to a dual wheel or single-wide wheel. Furthermore, a driver, mechanic or operator may need to inspect or access a hub odometer, an oil reservoir gauge, lug nuts, tire inflation valve, or some other component.

Some prior art systems and devices include rigid wheel covers. A disk, manufactured from aluminum or some other metal, is secured to a bracket using screws, bolts, or other hardware. A drawback to this type of wheel cover is the rigid disk is easily damaged by contact with a curb, post, or other traffic device. The time required to install and remove the cover, and the likelihood of a rigid cover rattling, making noise, and coming loose are also disadvantages. Some prior art methods involve installing a frame and then attaching (such as by using a zipper) a fabric shield to the frame. In operation, prior art approaches using a zipper typically utilize the inner bead or "drop-center" of the wheel. As such, prior art wheel covers may touch the outer flange but effectively "grabs" inside. A drawback is that this type of wheel cover does not fit all types of wheels, such as single-wide wheels, and requires the wheels to be cleaned when they may be heavily soiled and difficult to clean.

Some prior art methods of attaching a wheel cover to a truck wheel include a hub feature, such as a mounting bracket, that projects outwardly from the end of the wheel hub approximately to the plane of the wheel rim. However, these attachment methods require tools and significant labor for installation or removal, which is necessary to perform most repairs or maintenance on the wheels.

Some prior art methods include a peripheral mounting method in which clips or other means attach a wheel cover to the outer flange of the wheel rim. However, attachment brackets which rely on hooks or spring clips are susceptible to loosening under stress and are difficult to install. Furthermore, prior art methods of mounting wheel covers to the periphery of the wheel have shortcomings due to the difficulty of rigidly attaching a clip or other mounting feature to the outer wheel rim or flange. Further, the depth from the plane of the outer wheel rim inward to the region of the wheel hub where the inner diameter of the wheel is larger than elsewhere is typically several inches on dual wheels and single-wide wheels. As a result, these wheels cannot accommodate a wheel cover that can normally be snapped into engagement with the wheel outer flange (as in the case with many passenger car wheel/wheel disk arrangements, where conventional hub caps are used).

Furthermore, many of the prior art attachment systems are undesirably complex, either in the number of components required and/or the labor needed for installation and removal. The manufacturing costs of systems having a large number of components can be prohibitive.

Many prior art wheel covers are constructed of a solid surface with no openings to allow for ventilation that may assist to cool the hub area and adjacent brake components or to provide an exit means for water and debris.

SUMMARY

One aspect of embodiments described herein is to provide aerodynamic wheel covers and means for attaching an aerodynamic wheel cover to a dual wheel or single-wide wheel assembly on a large vehicle.

Another aspect of embodiments described herein is to provide wheel cover mounting arrangements that allow for a range of geometric shapes of the wheel cover disk.

Another aspect of embodiments described herein is to provide wheel cover mounting arrangements that include an air hose extension and a valve positioned on the disk, the disk components (base),or in an opening adjacent the disk to provide means for inspecting or maintaining tire pressure.

Another aspect of embodiments described herein is to provide wheel cover mounting arrangements such that a wheel cover can be installed and removed without tools, or with very readily-available tools, and with minimal time and effort such that an individual removing and installing the wheel covers is not significantly inconvenienced by the wheel cover.

The mechanism and associated wheel cover mounting method disclosed herein improve the wheel cover installation and removal process since the method requires no tools or a reduced number of tools and can be accomplished faster and simpler, with fewer parts than existing wheel cover mounting methods and mechanisms.

An advantage to embodiments disclosed herein may be that a wheel cover is less susceptible to torsion or awkward loading like center-mounted disks, and that the wheel cover does not require an "inset" bead such as found in passenger cars/trucks.

An advantage may be the ability to provide advertising or other information for display to passers-by or an operator or maintenance personnel.

In one broad respect, embodiments disclosed herein may include an aerodynamic wheel cover assembly, comprising a bracket assembly configured to couple to a wheel, a base assembly for coupling with the bracket assembly, a piston for positioning in the inner perimeter, a spring having a first end in contact with the base and a second end in contact with the piston, an alignment bushing having a plurality of arms separated by a plurality of notches, and a disk assembly compatible with the base assembly. The base assembly may include a base having an inner wall forming a cylindrical perimeter and a plurality of extensions separated by a plurality of channels. The piston may include an outboard side formed with a plurality of ribs separated by a plurality of notches and a plurality of spokes positioned between the extensions. The disk assembly may include an inner ring having a plurality of tabs, a resilient disk, and an outer ring configured to contact the wheel when the disk assembly is coupled to the base assembly. The plurality of tabs may be translatable in a direction substantially parallel to a longitudinal axis of the piston to a first position to deflect the spring relative to the longitudinal axis. The plurality of tabs may also be rotatable about the longitudinal axis to a second position, whereby force applied by the spring maintains the plurality of tabs between the plurality of ribs. In some embodiments, the inner ring comprises a metal ring. In some embodiments, the inner ring is formed with a thickness greater than a thickness of the resilient disk. In some embodiments, the piston comprises an inner shaft, wherein the plurality of spokes connect the inner shaft to the outer ring of the piston and wherein depression of the inner shaft depresses the spring in the piston. In some embodiments, one or more of the base, the piston and the resilient disk are injection-molded.

In another broad respect, embodiments disclosed herein may include a method for manufacturing an aerodynamic wheel cover assembly. A method may include forming a base assembly comprising a base having an inner wall and one or more extensions separated by a plurality of channels, forming a piston, forming an alignment bushing, forming a bracket assembly comprising a fixed bracket and an adjustable bracket, forming a disk assembly and assembling the base assembly with a spring having a first end in contact with the base and a second end in contact with the piston. The piston may be formed having an outboard side formed with a plurality of ribs separated by a plurality of notches and a plurality of spokes, each spoke having a width less than an arc length between adjacent extensions, the plurality of spokes positioned between the extensions. The alignment bushing may be formed with a plurality of arms separated by a plurality of notches, wherein each arm has an arc length corresponding approximately to the arc length of each notch in the piston. The disk assembly may be formed with an inner ring having a plurality of tabs, a resilient disk, and an outer ring configured to contact the wheel when the disk assembly is coupled to the base assembly. The inner ring may be fixed to the disk or it may spin freely. Locking means may be provided such as riveting, adhesives, etc. The inner ring may be insert-molded into the disk via injection molding techniques. The disk may receive the inner ring via one-way clips or the like that secure the ring in place by using molded features in an injection molded disk. Notches around the perimeter of the disk may reduce the potential for shear load failure when using double-sided tape, for example. The disk may be molded to accommodate a removable rubber or plastic center cap to seal the base assembly from debris, etc., and also to provide a cosmetic and more aerodynamic surface. A plastic center cap may be configured with a chain or other means for maintaining the cap in close proximity to the disk when it is moved away from the center such that the cap, if not properly positioned on the wheel cover, would be attached to the wheel cover and an operator may be less likely to misplace the cap when it is removed. The piston may be provided with injection-molded inserts in lieu of extensions, for example, to provide additional clamping strength and reduced cost. The plurality of tabs may be translatable in a direction substantially parallel to a longitudinal axis of the piston to a first position to deflect the spring relative to the longitudinal axis. The plurality of tabs may also be rotatable about the longitudinal axis to a second position, whereby force applied by the spring maintains the plurality of tabs between the plurality of ribs. In some embodiments, one or more of the base, piston, alignment bushing, and inner ring are machined. In some embodiments, one or more of the base, piston, and alignment bushing are injection molded. In some embodiments, the inner ring is machined from stainless steel. In some embodiments, forming the piston comprises forming an inner shaft coupled to the ring with a plurality of spokes.

In another broad respect, embodiments disclosed herein may include a system for maintaining an aerodynamic cover on a wheel. The system may include a disk assembly, a base assembly, a piston at least partially received in the base, a spring having a first end in contact with the base and a second end in contact with the piston, and a bracket assembly configured to couple to a hub of a wheel. The disk assembly may include an inner ring having a plurality of tabs, a resilient disk, and an outer ring. The base assembly may include a base having an inner wall having one or more extensions separated by a plurality of channels. The piston may have an outboard side formed with a plurality of ribs separated by a plurality of notches and one or more spokes. Each spoke may have a width less than an arc length between adjacent extensions. Each spoke may be positioned between each extension to align and prevent rotation. Other ways to achieve rotational alignment with the piston and the base may include selecting complementary geometric shapes. The plurality of tabs may be translatable in a direction substantially parallel to a longitudinal axis of the piston to a first position to deflect the spring relative to the longitudinal axis. The plurality of tabs may also be rotatable about the longitudinal axis to a second position, whereby force applied by the spring maintains the plurality of tabs between the plurality of ribs. In some embodiments, the axial extensions are formed on the base. In some embodiments, the axial extensions are formed on the piston. In some embodiments, the piston further includes an inner shaft coupled to the outer ring via the spokes. In some embodiments, the disk assembly comprises a disk formed from a resilient material. In some embodiments, the disk assembly comprises a disk having a selected concavity, wherein the disk is formed to be in a first configuration when the disk does not contact a wheel and in a second configuration when the disk contacts a wheel. In some embodiments, the first configuration is concave. In some embodiments, the first configuration is planar. In some embodiments, the second configuration is convex.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIG. 3 depicts an exploded view of one embodiment of a system for mounting an aerodynamic wheel cover;

FIG. 5 depicts an exploded view of one embodiment of a base assembly for mounting an aerodynamic wheel cover;

FIG. 13 depicts a perspective view of a single wheel assembly commonly found on a steer axle;

FIG. 14 depicts a view of a hub odometer;

FIG. 15 depicts a view of a type of fluid reservoir commonly found on wheel assembly hubs;

FIGS. 16A-16D depict views of one embodiment of a wheel cover assembly; and

DETAILED DESCRIPTION

Figure 1A:
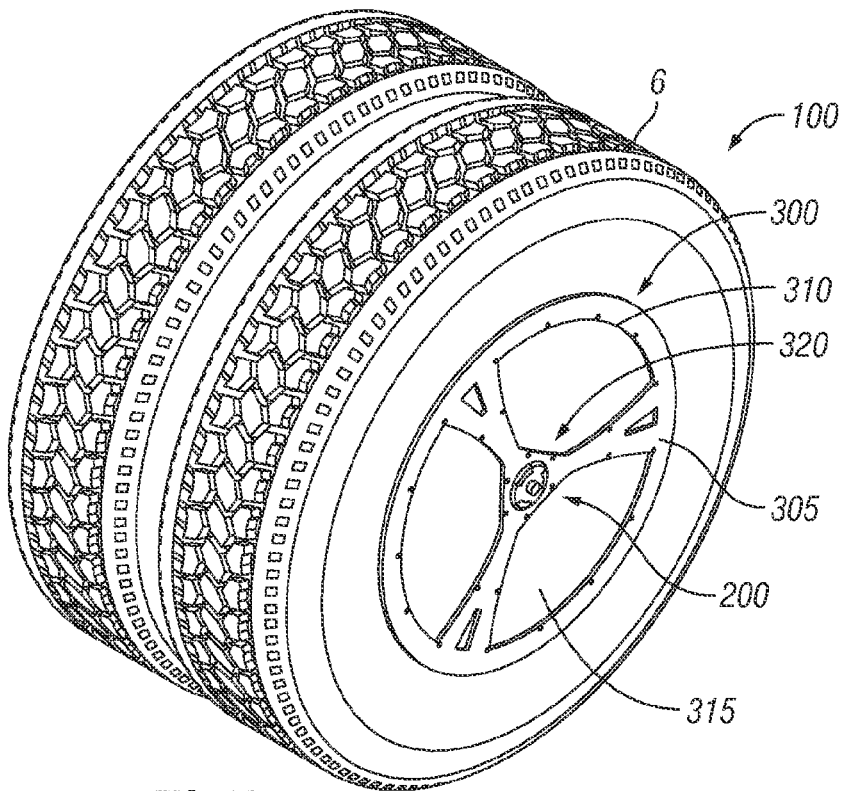
FIGS. 1A-1B depict perspective and side views of one embodiment of an aerodynamic wheel cover and a system including an aerodynamic wheel cover mounted on a wheel assembly.

Embodiments of the invention and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, product, article, or apparatus that comprises a list of elements is not necessarily limited to only those elements but may include other elements not expressly listed or inherent to such process, product, article, or apparatus. Further, unless expressly stated to the contrary, "or" refers to an inclusive "or" and not to an exclusive "or". For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead these examples or illustrations are to be regarded as being described with respect to one particular embodiment and as illustrative only. Those of ordinary skill in the art will appreciate that any term or terms with which these examples or illustrations are utilized encompass other embodiments as well as implementations and adaptations thereof which may or may not be given therewith or elsewhere in the specification and all such embodiments are intended to be included within the scope of that term or terms. Language designating such non-limiting examples and illustrations includes, but is not limited to: "for example," "for instance," "e.g.," "in one embodiment," and the like. Furthermore, any dimensions, materials or other such characteristics are provided by way of example and not limitation.

Tractor-trailers travel significant distances every year. Consequently, the cumulative effect of even incremental amounts of drag on a tractor-trailer can lead to significant increases in overall operating costs. Such increased transportation costs are typically absorbed by consumers of the products transported. One significant source of drag on tractor-trailers, and hence increased transportation costs, are the wheel assemblies of the tractor-trailers. In general, the aerodynamic drag of a vehicle increases when air flow is affected by a wheel opening, especially deep wheel openings commonly found on tractor-trailer vehicles. Consequently, there is a need for wheel covers that decrease drag. However, as discussed previously, previous solutions for attaching covers to hubs are unsatisfactory for use with tractor trailers. Accordingly, embodiments described herein provide mechanisms and methods for attaching cover assemblies to wheel assemblies (as used herein, the term "wheel assembly" may refer to a single wheel or a dual wheel assembly, particularly as it relates to a tractor-trailer vehicle).

Figure 1B:
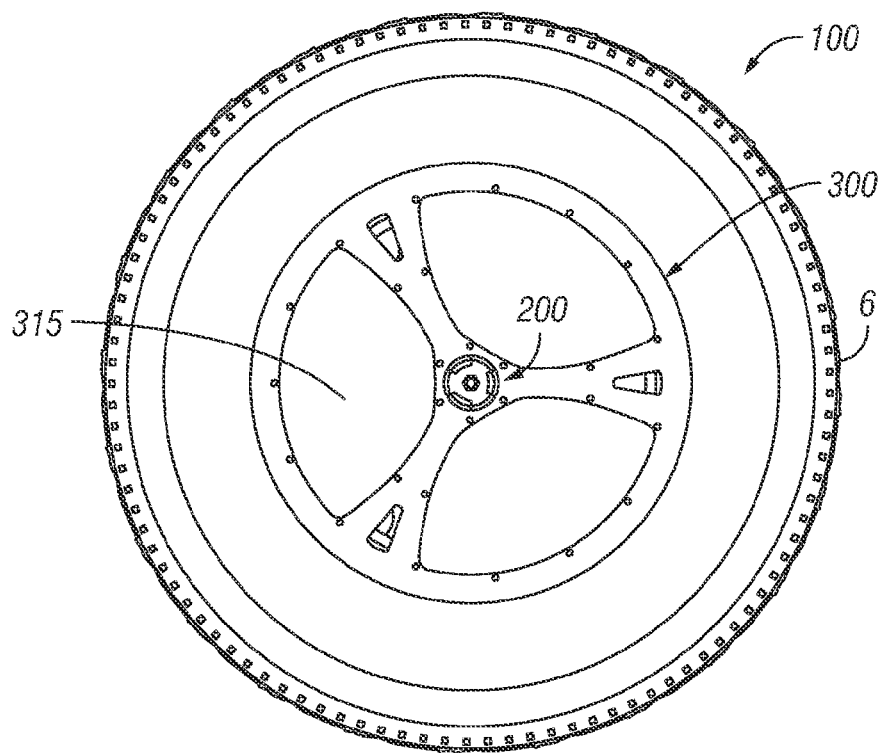

According to one embodiment, a wheel cover assembly may include a removable wheel cover or disk assembly coupled with a fixed hub mounting assembly that is mounted or otherwise coupled to a wheel assembly. The wheel assembly may be a single wheel or a dual wheel assembly, particularly as it relates to a tractor-trailer vehicle, or other type of wheel assembly. FIGS. 1A-1B depict perspective and side views of one embodiment of aerodynamic wheel cover assembly 100 including disk assembly 300 mounted on a hub mounting assembly 200 which is coupled to wheel assembly 6. In some embodiments, disk assembly 300 may be formed as outer retaining ring 310 coupled with spokes 305 to inner ring 320 and disk 315. Disk 315 may be single piece or may be formed as disk inserts 315. Outer retaining ring 310, spokes 305 and disk 315 may be constructed separately or may be formed as a monolithic disk assembly 300. Disk 315 may be formed generally planar or non-planar. Non-planar disks 315 may have a substantially conical or concave form. In some embodiments, disk 315 may be oriented with a concavity facing inboard and wheel cover assembly 100 may be configured such that installation of disk assembly 300 biases disk 315. Biasing disk 315 may lessen the concavity, may result in an otherwise planar disk having a negative concavity (i.e., disk 315 has a convex shape) or may otherwise change the configuration of the disk from an initial configuration to a second configuration or flexion. In some embodiments, disk assembly 300 provides a substantially continuous surface to facilitate aerodynamic flow around wheels 6. In other embodiments, disk assembly 300 may be configured to facilitate aerodynamic flow through the wheel cover, whereby the wheel cover may act as a fan or radial vent, for example. The size, rigidity, concavity/convexity, surface texture, venting features, or contact area with wheel(s) 6 may be selected to promote a desired air flow around wheel(s) 6. Furthermore, portions of disk assembly 300 may be manufactured with clear material or with openings to allow visual access to components of wheel(s) 6.

Figure 2A:
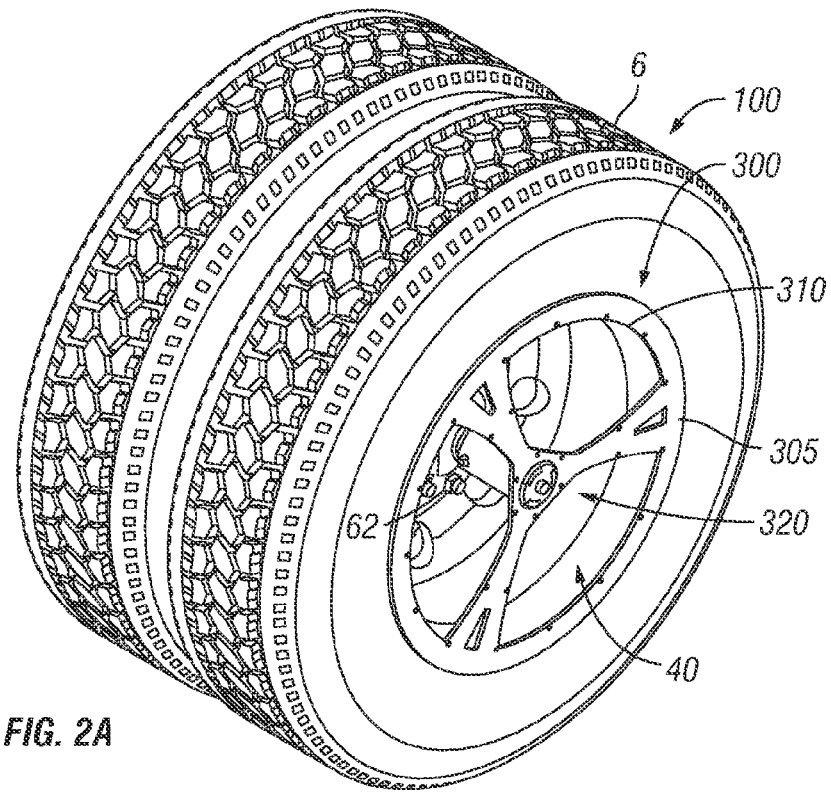
FIGS. 2A-2B depict perspective and side views of one embodiment of an aerodynamic wheel cover and a system including an aerodynamic wheel cover mounted on a wheel assembly.
Figure 2B:
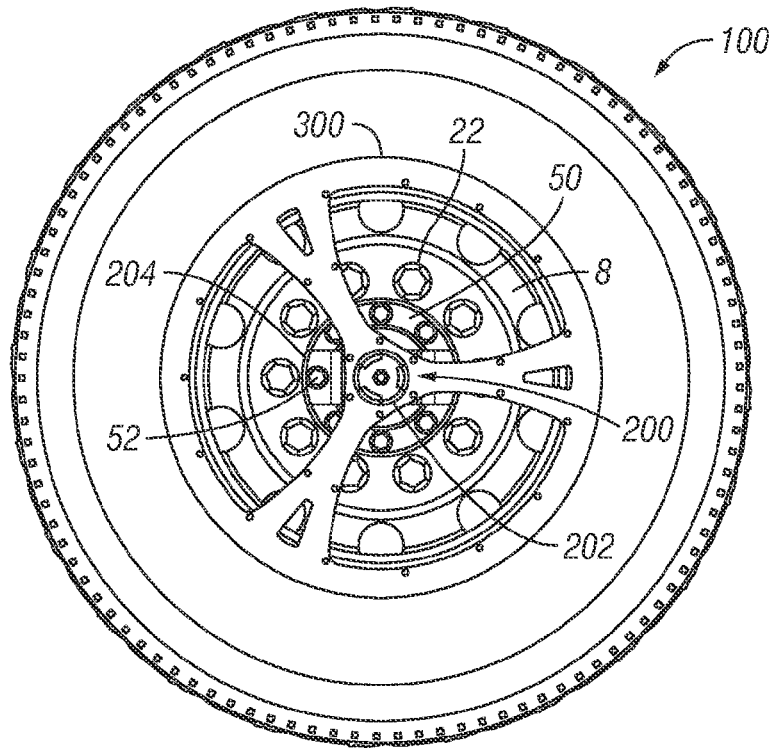

FIGS. 2A-2B depict perspective and side views of an alternate embodiment of an aerodynamic wheel cover assembly 100 including hub mounting assembly 200 mounted on wheel assembly 6. Attachment or coupling hub mounting assembly 200 with hub 50 may involve using hardware 52 to couple bracket 204 to hub 50, while still allowing access to wheel nuts 22. As depicted in FIGS. 2A and 2B, disk assembly 300 may be formed as an outer retaining ring 310 coupled with spokes 305 to inner ring 320 with disk inserts 315. The inner portion 40 of the rim (e.g., the area encircled by the rim's outboard flange), including the hub 50 may be exposed for increased circulation, to prevent debris from being trapped inside wheel cover assembly 100, to improve cooling, etc.

FIG. 3 depicts an exploded view of one embodiment of aerodynamic wheel cover assembly 100 including hub mounting assembly 200 and disk assembly 300. Hub mounting assembly 200 may include bracket assembly 150 and base assembly 250. Bracket assembly 150 may be configured or formed to allow access to components associated with wheel 6, such as hub 50, the rim, a tire inflation valve, a fluid level indicator, lug nuts, or the like. Bracket assembly 150 may be fastenable to hub 50 such that bracket assembly 150 may be removed or installed using tools. Tools used to remove bracket assembly 150 may be standard tools (e.g., sockets) or specialized, and may include hardware and locking mechanisms to prevent accidental or unauthorized removal of bracket assembly 150. In some embodiments, bracket assembly 150 may be connected to hub 50 utilizing studs 52 or some other pre-existing hardware associated with hub 50. In some embodiments, stationary bracket 110 may be coupled to hub 50, such as using hub nuts 53 threaded onto studs 52. Adjustable bracket 125 may be coupled fixedly or pivotally to stationary bracket 204 using hardware 115 or some other mechanical means. Adjustable bracket 125 may be selectively coupled to stationary bracket 204 such that the position of the outboard end of adjustable bracket 125 may be selected. That is, in the embodiment shown, the outboard position of base assembly mounting platform 127 may be adjusted. Selective adjustment of adjustable bracket 125 may be performed utilizing a series of holes, slots, or other means of linear positioning.

Also depicted in FIG. 3, hub mounting assembly 200 may include base assembly 250. Base assembly 250 may be coupled to hub 50 via bracket assembly 150 to mount disk assembly 300. In some embodiments, base assembly 250 includes base 210, resilient member or spring 212, piston 214 and alignment bushing 220. Base assembly 250 may be coupled with adjustable bracket 125 using hardware or other mechanical, thermal or chemical means, or may be formed integral with adjustable bracket 125.

Figure 4B:
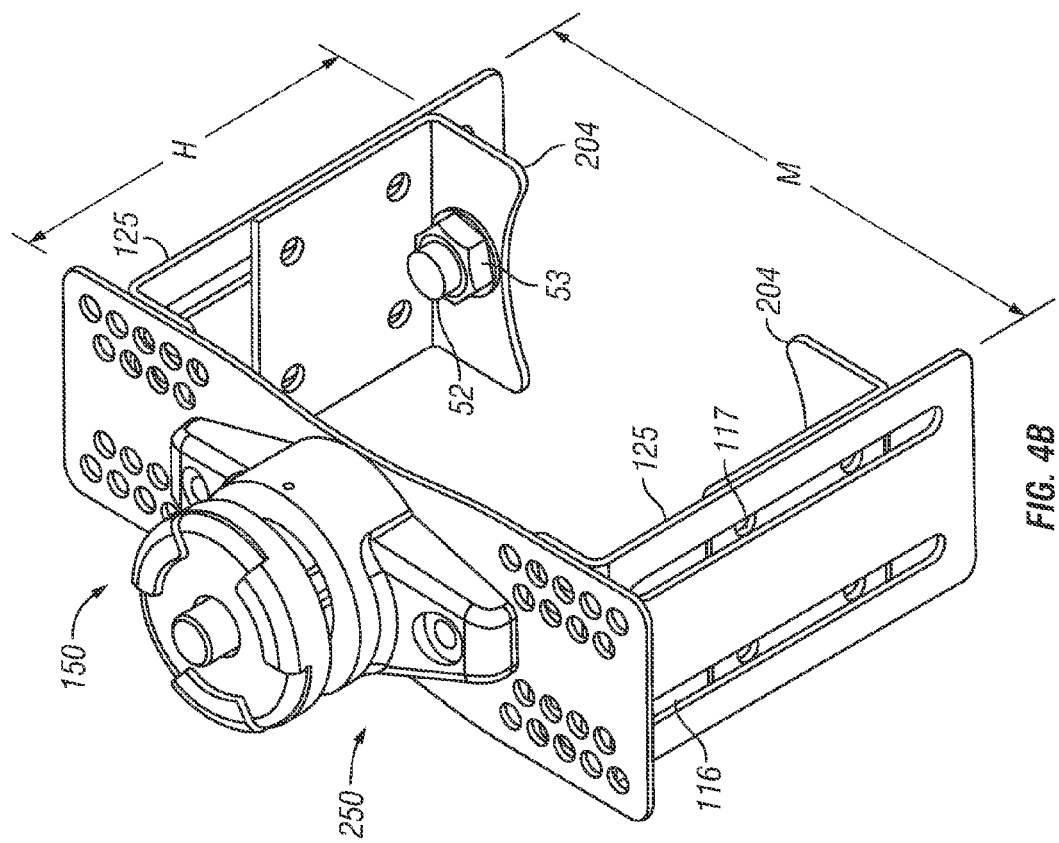
FIGS. 4A and 4B depict top and perspective views of one embodiment of an adjustable bracket for use in mounting an aerodynamic wheel cover.
Figure 4A:
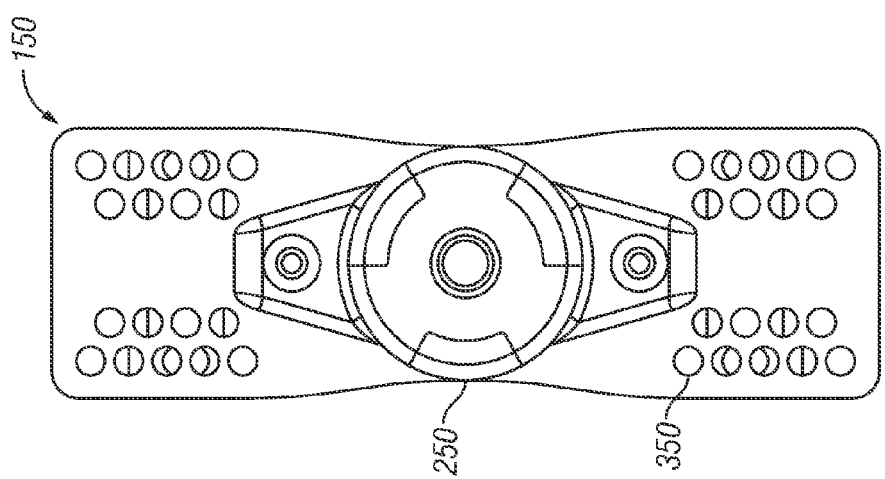

FIGS. 4A-4B depict top and perspective views of one embodiment of bracket assembly 150 having adjustable bracket 125 for use with an aerodynamic wheel cover and a system for mounting an aerodynamic wheel cover on a wheel assembly. Bracket assembly 150 may be coupled with hub 50 using nuts 53 on studs 52. In some embodiments, slots 116 and openings 117 may allow adjustments of the height H of adjustable bracket 125 relative to stationary brackets 110 to accommodate hubs of various heights, and openings 350 and 127 allow adjustments to width W of bracket 125 to allow adjustments for various diameters of hubs 50, or to accommodate other devices, for example automatic inflators, on hub 50

FIG. 5 depicts an exploded view of components of one embodiment of base assembly 250. In some embodiments, base assembly 250 comprises base 210, piston 214, spring 212, and alignment bushing 220. In some embodiments, inner walls of base 210 have a selected depth and recessed area 211 for retaining spring 212. In some embodiments, inner walls 209 form a cylinder. Inner walls 209 defines a space within which piston 214 is able to translate axially. Piston 214 comprises ring 218 about an inner shaft 215 aligned relative to longitudinal axis A-A. Ring 218 includes notches 216 of arc length D separated by ribs 229 of arc length C. Inner shaft 215 includes a first end 213 for retaining a second end of spring 212 and a second end 222. Inner shaft 215 is joined to ring 218 by a set of radially extending spokes 232 separated by openings of approximately a width or an arc length E.

Alignment bushing 220 includes an outboard area having a set of outwardly extending radial arms 217 having an arc length of approximately D, separated by notches 230 of an arc length of approximately C. A set of extensions 221 extend inboard and have an arc length of approximately E. An aperture 234 is sized so that second end 222 of inner shaft 215 can pass.

In operation, extensions 221 can pass through the gaps between spokes 232, with the spokes fitting in channels 231. Alignment bushing 220 can be coupled to base 210. Alignment bushing 220 may be bolted, welded, glued, epoxied, or otherwise mechanically, thermally, or chemically coupled to base 210 to inhibit movement of alignment bushing 220 relative to base 210. In some embodiments, alignment bushing 220 and base 210 comprise apertures 206 that can be aligned such that a pin, screw, rivet or other hardware (not shown) can be inserted to hold alignment bushing 220 relative to base 210.

Biasing member 212 can bias piston 214 toward alignment bushing 220 such that ribs 229 fit in notches 230 and radially extending arms 217 fit in notches 216. The second end of inner shaft 215 can be accessible through aperture 234. By pressing on second end 222 of inner shaft 215, piston may be translated in an inboard direction such that there is clearance between the inboard surfaces of radially extending arms 217 and the outboard surfaces of ribs 229. Consequently, a disk assembly 300 may rotate for installation and removal, as discussed below.

Figure 6:
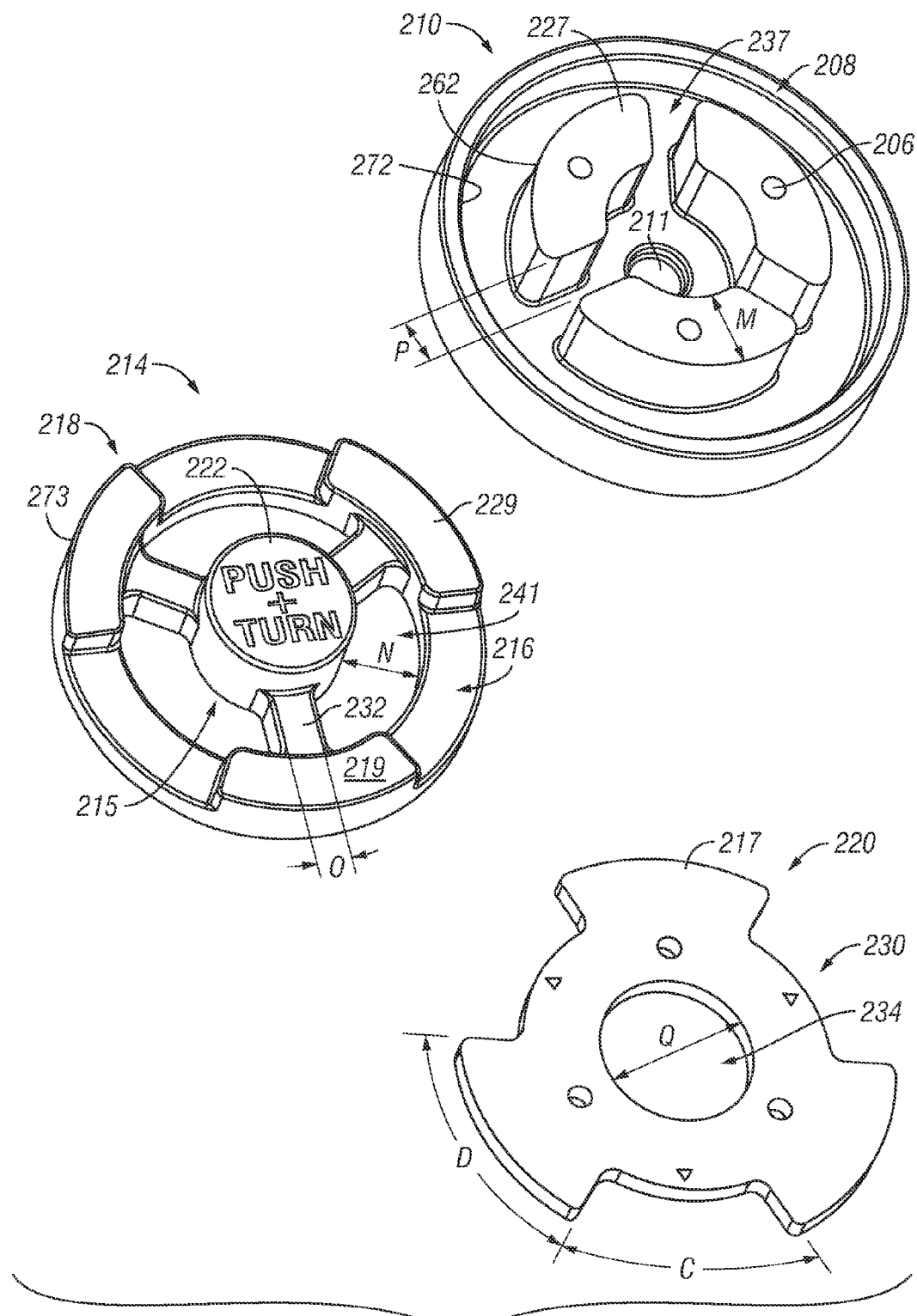
FIGS. 6 and 7 depict views of embodiments of a base assembly.
Figure 7:
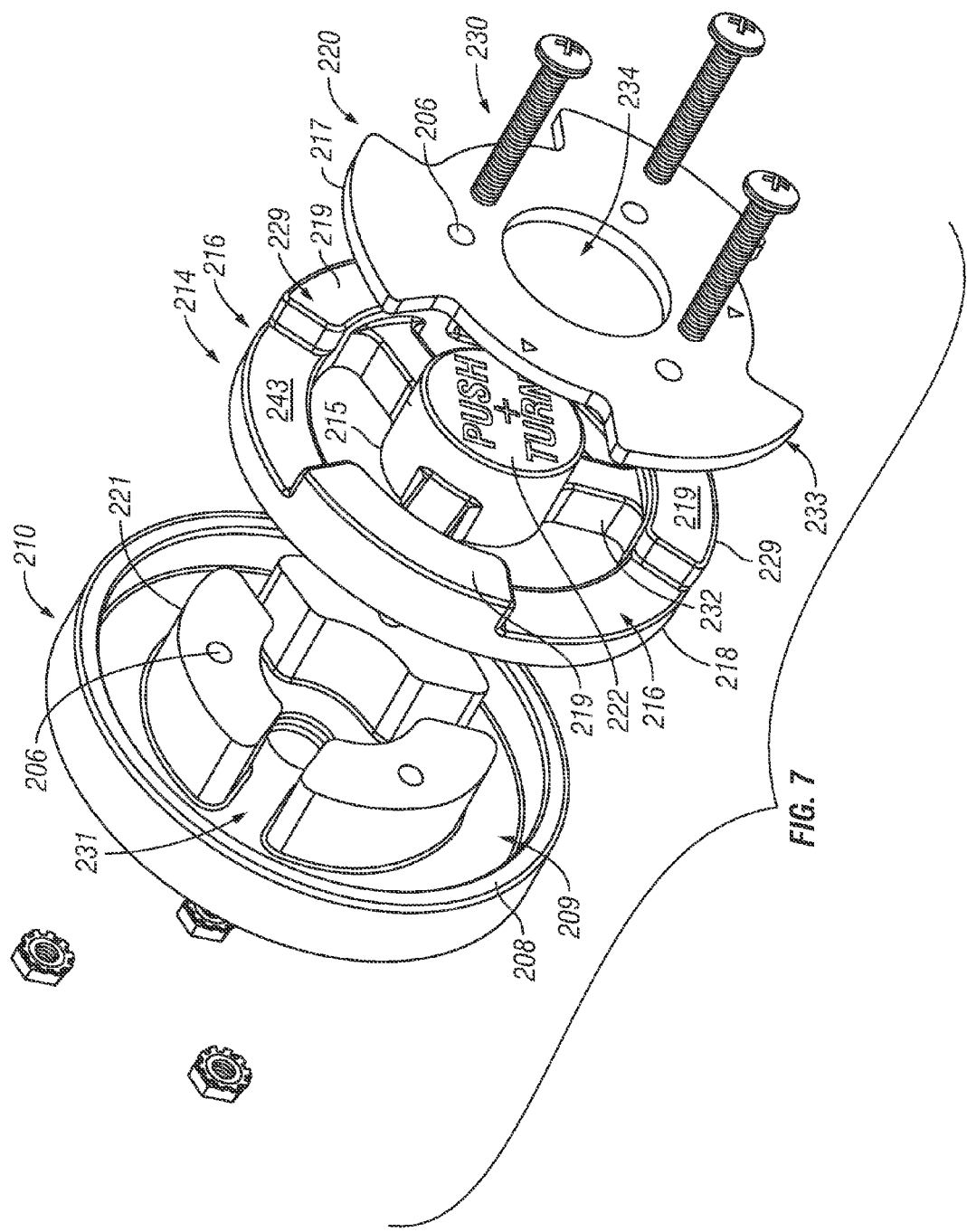

FIGS. 6 and 7 depict perspective views of another embodiment of base assembly 250. Embodiments disclosed herein may include features for preventing rotation of piston 214 in base assembly 250. In the embodiment of FIGS. 6 and 7, piston 214 is similar to that depicted in FIG. 5, but base 210 includes extensions 227 that extend outboard, rather than alignment bushing 220 including projections 221 that extend inboard. Although not illustrated, a biasing member, such as depicted in FIG. 5, may bias piston 214 away from base 210. Channels 237 have a width or arc length P to accommodate spokes 232 of arc length 0. Channels 237 in base 210 accommodate spokes 232 to ensure alignment of extension 227 through apertures 241. Each extension 227 is sized to extend through apertures 241 between spokes 232. For example, extensions 227 may have a width M sized to fit through aperture 241 having width N. Base 210 has an inner surface 272 for contact with outer surface 273 of outer ring 218 of piston 214. Alignment bushing 220, in the example of FIGS. 6-7 can be a relatively flat sheet piece having radially extending arms 217 separated by notches 230 and having an aperture 234 to accommodate the second end of piston 214.

Biasing member 212 can bias piston 214 toward alignment bushing 220 such that ribs 220 fit in notches 230 and radially extending arms 217 fit in notches 216. The second end of inner shaft 215 can be accessible through aperture 234. By pressing on second end of inner shaft 215, piston may be translated in an inboard direction such that there is clearance between the inboard surfaces of radially extending arms 217 and the outboard surfaces of ribs 229. Consequently, a disk assembly 300 may rotate for installation and removal, as discussed below.

Embodiments disclosed herein include a system that allows tool-free installation and removal of a resilient disk. To reduce binding and to better align the components, the shape of each extensions 221 or 227, the width or arc length of channels 231 or 237, the arc length of spokes 232, the width and arc length of apertures 215, the size of inner shaft 215 and aperture 235 can be selected such that piston 214 is able to translate relative to alignment bushing 220. In operation, piston 214 is able to translate relative to alignment bushing 220 to allow second end 222 to be recessed with, flush with or extended beyond alignment bushing 230 and to allow ribs 229 to be recessed with, flush with or extend axially beyond radial arms 217.

As discussed below, tabs of a disk assembly 300 are able to be positioned in notches 230 and in contact with ribs 229 and depressed and rotated behind radial arms 217 into notches 216, and may use edge 262 of extensions 221 or 227 as a guide and with channels 231 or 237 small enough such that the tabs of the disk assembly do not bind or hang on axial extensions 221 or 227. In use, spring 212 exerts a force on piston 214 to maintain axial bias of ribs 229 of piston 214 in notches 230 of alignment bushing, thereby trapping the tabs of the disk assembly between the surfaces 243 of notches 216 and the radial arms 217 of the alignment bushing 220.

Advantageously, embodiments such as those described herein may be manufactured from metal (including alloys) or polymers. In some embodiments, components may be manufactured using CNC techniques. Some embodiments disclosed herein may be formed with CNC techniques on a three axis machine, which may advantageously allow for increasing or decreasing the scale of a device, and which may advantageously reduce production costs.

Figure 8:
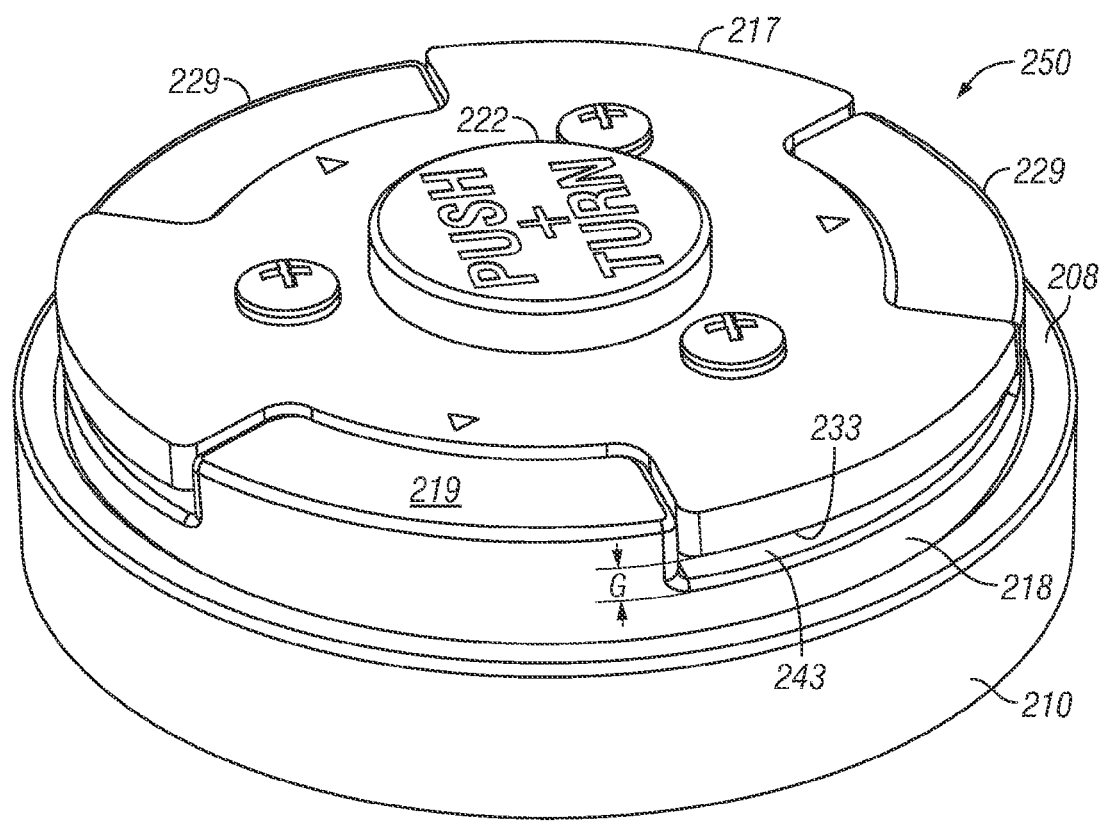
FIGS. 8-10 depict perspective views of one embodiment of a base assembly, illustrating one mode of operation.
Figure 9:
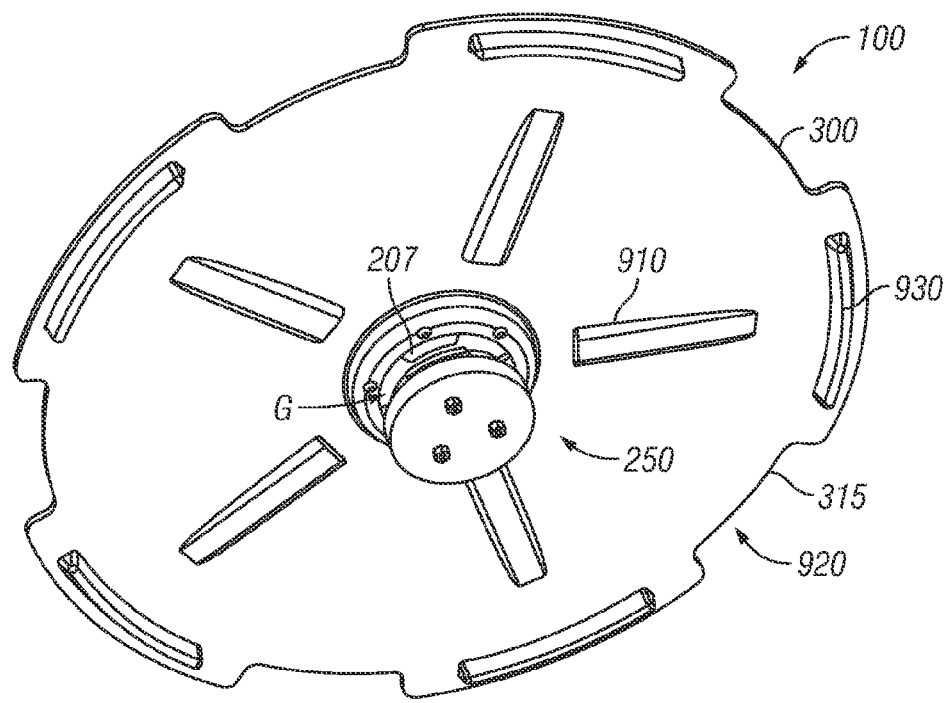
Figure 10:
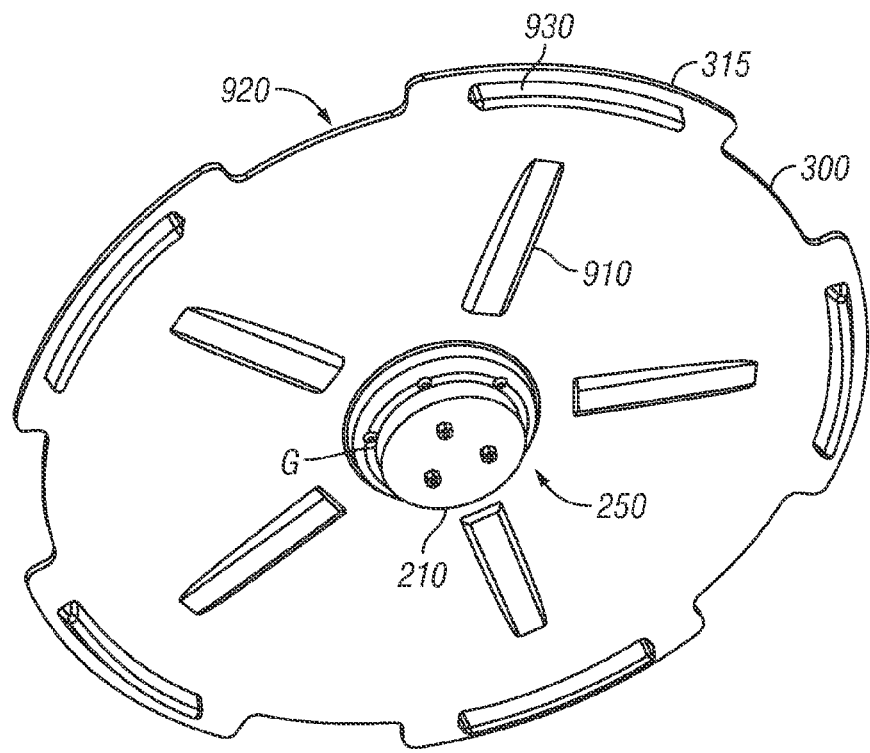

FIGS. 8-10 depict perspective views of one embodiment of base assembly 250, illustrating one mode of operation. In a first biased position, ribs 229 and notches 230 may be aligned (and corresponding notches 216 and radial arms 217 may also aligned) such that the force exerted by spring 212 biases piston 214 to a first extended axial position. In other biased positions, forces exerted on piston 214 may depress spring 212 such that a gap G is formed between surface 243 of rib 229 and surface 233 (i.e., back side) of radial arms 217. For example, a second biased position may be defined as a position of piston 214 where the gap G is large enough that the distance between the outboard surfaces of ribs 219 and the inboard surfaces of radial arms 217 is greater than the thickness of corresponding tabs on a disk assembly, thereby allowing the tabs of the disk assembly to be positioned between ribs 229 and radial arms 217. FIG. 9 depicts a partial perspective view of wheel cover assembly 100 in which piston 214 is in a second position such that tabs 207 of a disk assembly 300 are inserted through notches 230 (see e.g., FIG. 6) and able to rotate from a first position aligned with notches 230 to a second position aligned with notches 216 (see e.g., FIG. 6).

In a third biased position, spring 212 may exert a force on piston 214 such that piston 214 is not considered to be in the second biased position but piston 214 may not fully translate to the first biased position. FIG. 10 depicts a partial perspective view of one embodiment of wheel assembly 100 in which gap G is smaller than gap G in FIG. 9, illustrating base assembly 250 being in a third biased position. In this case, the tabs 207 of disk assembly 300 may be fully seated in notches 216 with the piston biasing the tabs 207 against the radial arms 217.

FIGS. 9 and 10 further depict an embodiment of disk assembly 300 in which disk 315 includes cutouts 920, insets 910, and rails 930. Insets 910, cutouts 920 and rails 930 may be formed or positioned to accommodate wheel balance weights on a rim, valve stems or other hardware, to increase air flow behind disk 315, to provide hand holds to assist in removal and installation of disk assembly 300, to provide a desired rigidity to disk assembly 300, and other advantages.

In operation, disk assembly 300 may be positioned in base assembly 250 to maintain disk assembly 300 in a desired position. FIGS. 11A-11F depict partial and perspective views of one embodiment of aerodynamic wheel cover assembly 100 and a system for mounting aerodynamic disk assembly 300 on hub mounting assembly 200, illustrating one method for installing a wheel cover on a wheel assembly.

Figure 11A:
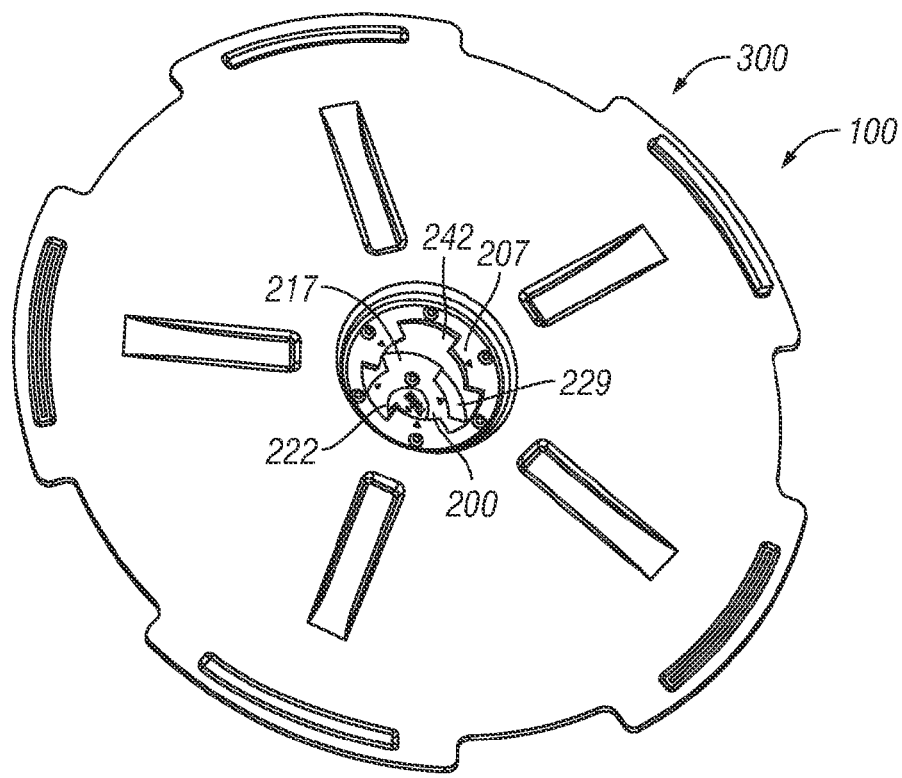
FIGS. 11A-11F depict views of one embodiment of an aerodynamic wheel cover and a system for mounting an aerodynamic wheel cover, illustrating one method for installing a wheel cover.
Figure 11B:
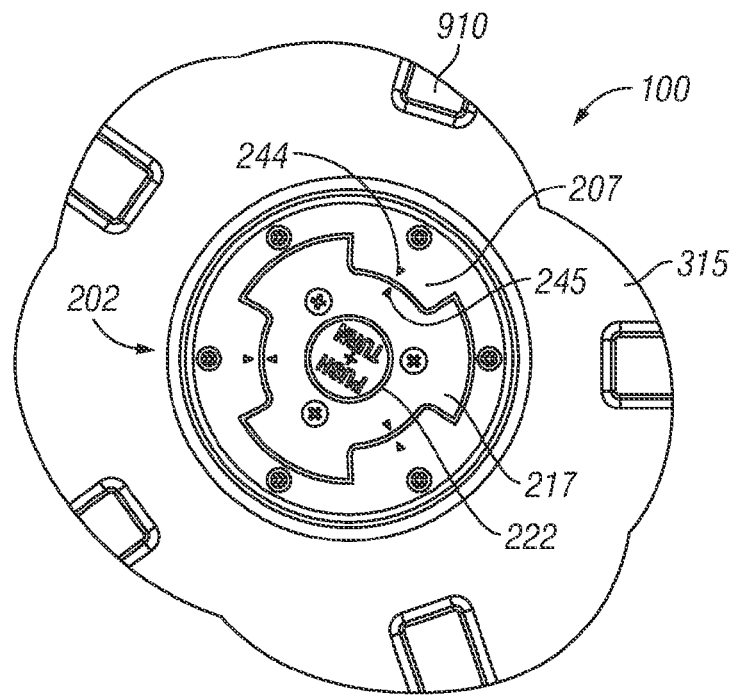

A first step in the mounting process involves aligning disk assembly 300 with base assembly 250. FIGS. 11A and 11B depict views of wheel cover assembly 100, illustrating a step for aligning disk assembly 300 with base assembly 250. In some embodiments, alignment includes visually checking that tabs 207 on inner ring 202 are positioned in notches 230 of alignment bushing 220. Alignment may be performed visually, such as ensuring tabs 207 cover ribs 229, aligning an arrow or other alignment mark 244 on disk assembly 300 with an arrow or some other alignment mark 245 on base assembly 200, or using a color, material, or other visual information. Alignment may also be performed using auditory or tactile information or cues, such as by selecting a geometry of the parts. For example, contacting tabs 207 on inner ring 202 with radial arms 217 and rotating wheel cover assembly 200 until the operator or mechanic hears or feels a click may indicate tabs 207 of disk assembly 300 are aligned with ribs 229. In one embodiment, alignment of disk assembly 300 to base assembly 250 is possible when piston 214 is in a first biased position, for example when radial arms 217 have a thickness such that ribs 229 appear recessed, flush, or above relative to radial arms 217.

Figure 11C:
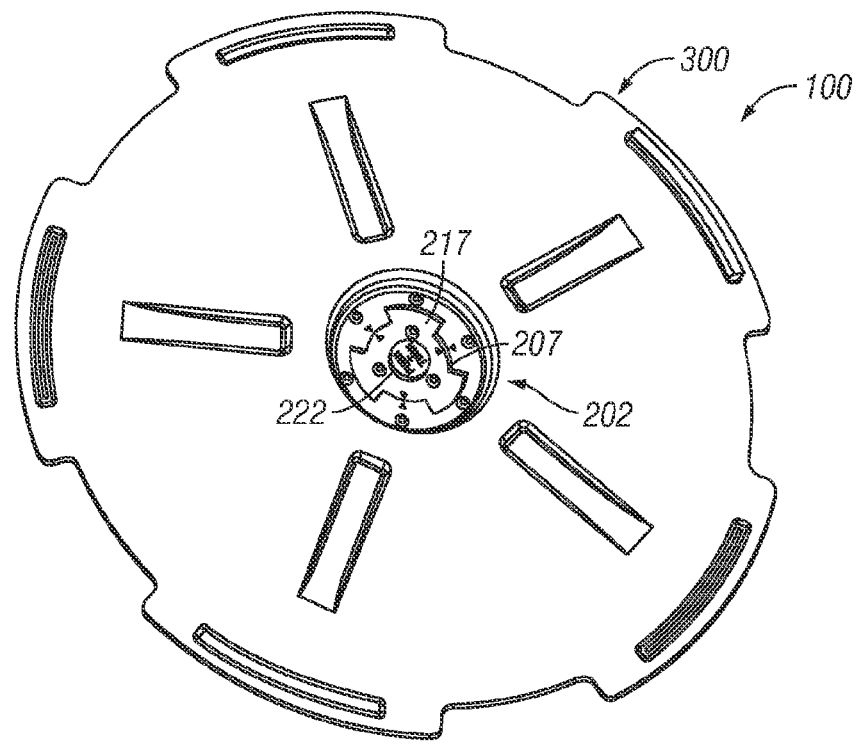
Figure 11D:
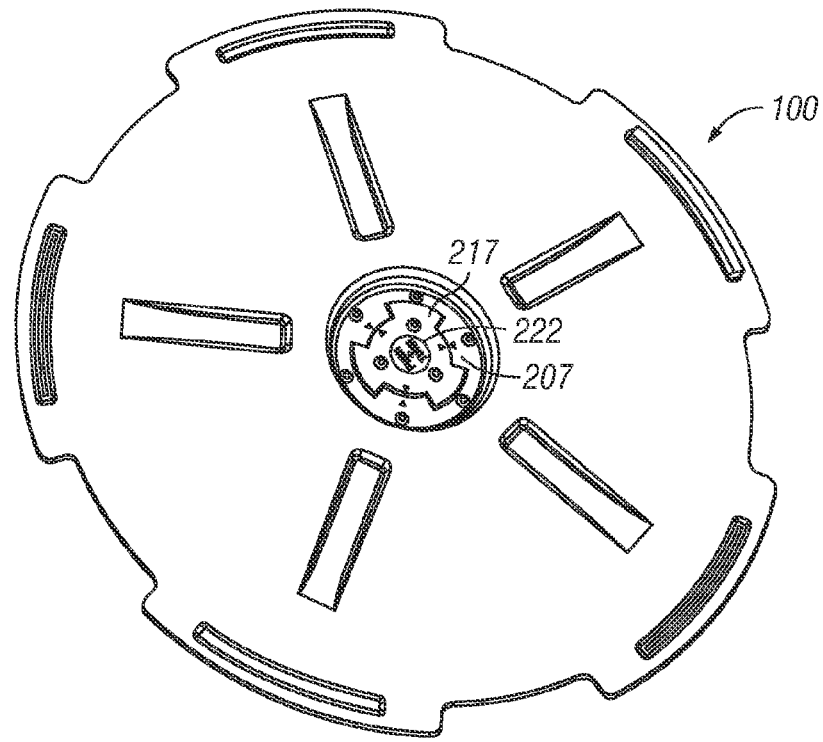

Once disk assembly 300 is in a desired position relative to notches 230, piston 214 can be depressed to a second biased position at a selected depth or depth range in cylinder 209 of base 210. Depressing piston 214 may be accomplished by applying pressure to actuator 222, (for example using a thumb or finger) or by applying pressure to tabs 207 in contact with ribs 229. FIGS. 11C and 11D depict perspective views of one embodiment of disk assembly 300, illustrating advancement of inner ring 202 axially inward such that tabs 207 are positioned behind radial arms 217 (such as shown in FIG. 11D), indicating compression of spring 212.

Figure 11E:
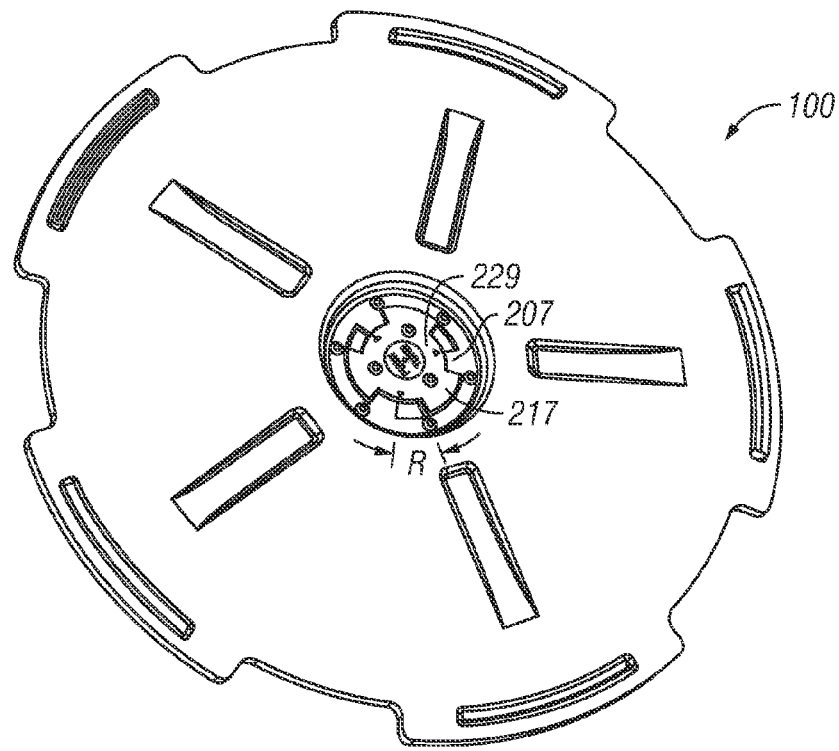
Figure 11F:
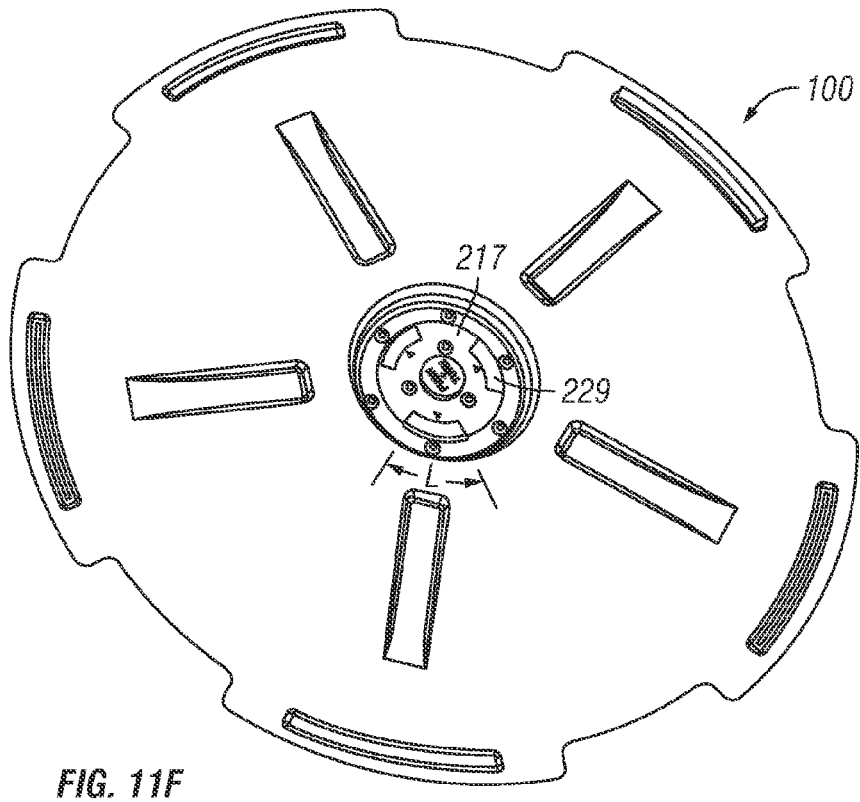

Once piston 214 is depressed a minimum amount, the gap G created between tab 207 and the bottom surface of radial arms 217 allows tabs 207 to be rotated relative to alignment bushing 220 and piston 214. FIGS. 11E and 11F depict perspective views of one embodiment of wheel cover assembly 100 with disk assembly 300. FIG. 11E depicts disk assembly 300 rotated at an angle R relative to base assembly 250 but less than angle L. When tabs 207 are offset from and rotated relative to radial arms 217 some angle R that is less than angle L, tabs 207 contact surfaces 219 of ribs 229 to inhibit ribs 229 (and thus piston 214 or spring 212) from returning to the first biased position such that piston 214 is in a second biased position. Rotation may be either clockwise or counter-clockwise.

Further rotation of disk assembly 300 some angle L relative to base assembly 250 allows tabs 207 to align with radial arms 217 aligned with notches 216 in ring 218 of piston 214. Alignment of tabs 207 with radial arms 217 in notches 216 allows ribs 229 to translate in notches 230 to allow piston 214 to move from the second biased position into a third biased position. In some embodiments, piston 214 does not translate to the first biased position, but still translates to a biased position that impedes inner ring 202 of disk assembly 300 from rotating. FIG. 11F depicts a perspective view of one embodiment of wheel cover assembly 100 in which disk assembly 300 is rotated angle L to align tabs 207 with radial arms 217, thus allowing ribs 229 to align in notches 230.

A partial release of compressive forces on spring 212 allow spring 212 to extend to maintain ribs 229 in notches 230. Maintaining ribs 229 in notches 230 provides security to wheel cover assembly 100 in that piston 214 is further unable to rotate and disk assembly 300 is securely coupled with base assembly 250. Using steps such as those depicted in FIGS. 11A-11F, disk assembly 300 with tabs 207 may be engaged with ribs 229 on piston 214 such that disk assembly 300 is secured to base assembly 250, effectively locking disk assembly 300 yet allowing some motion to accommodate curbs and other objects or users that might contact outer ring 180, spoke 185, inserts 215 or other components of disk assembly 300.

Removal of disk assembly 300 may be accomplished by performing these steps in reverse order such that piston 214 is depressed to the second biased position, disk assembly 300 is rotated to align tabs 207 with notches 230 and piston 214 such that tabs 207 can be withdrawn from base assembly 250.

Figure 12A:
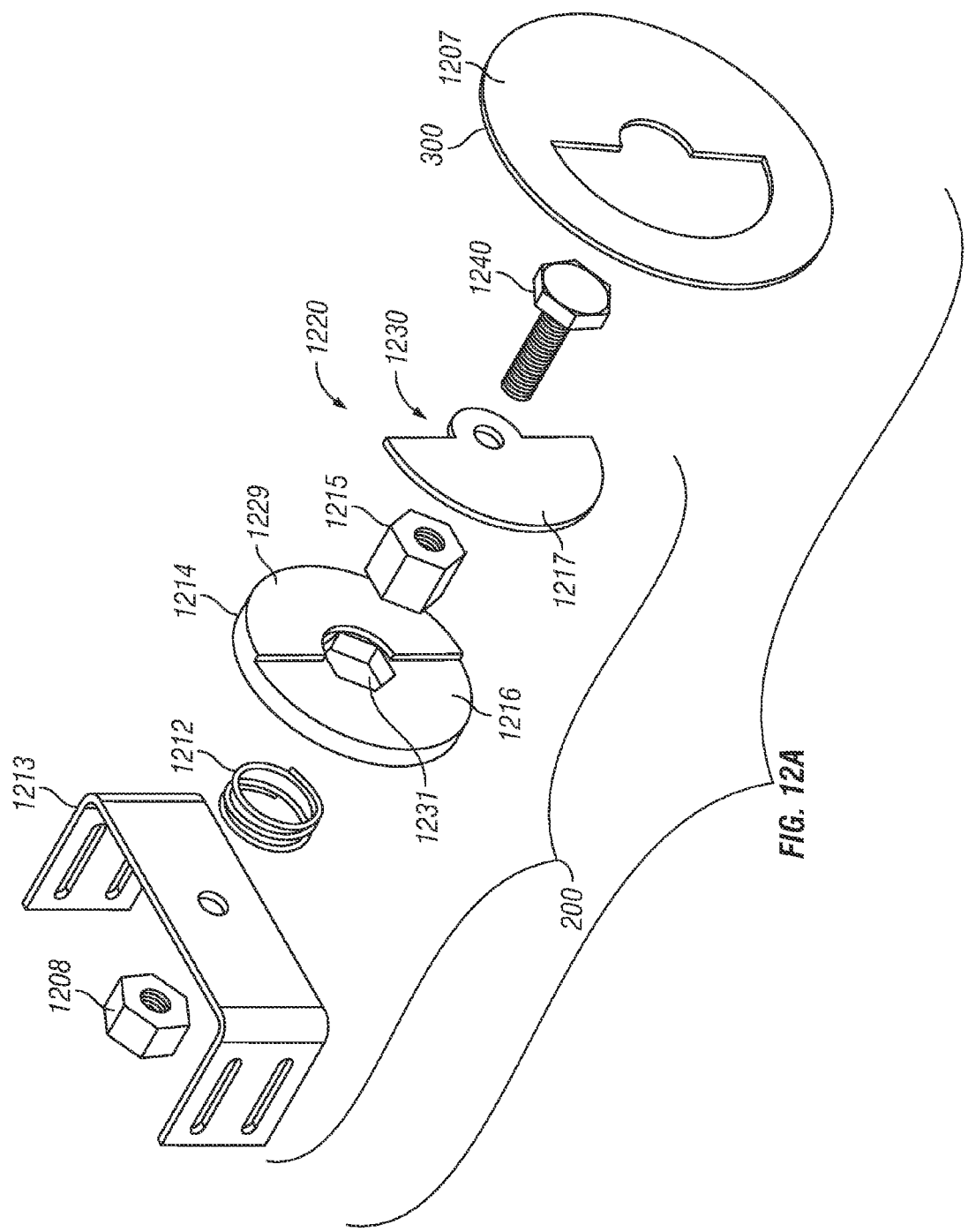
FIGS. 12A-12C depict views of one embodiment of a wheel cover assembly.
Figure 12C:
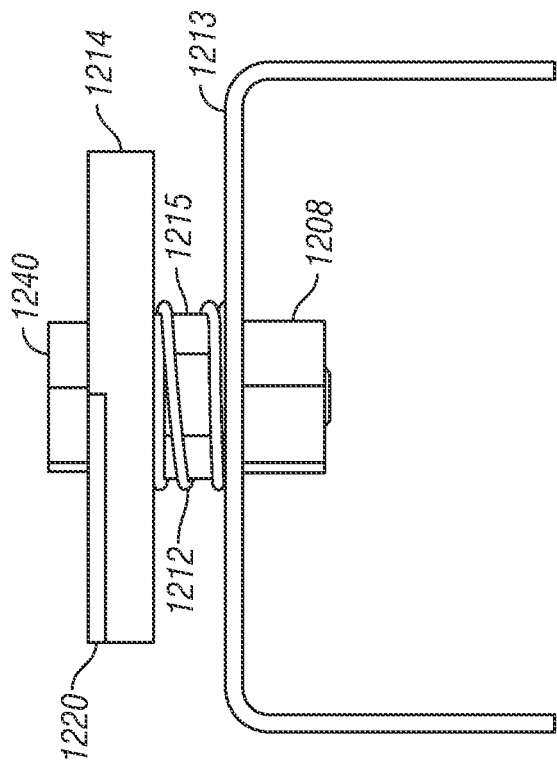
Figure 12B:
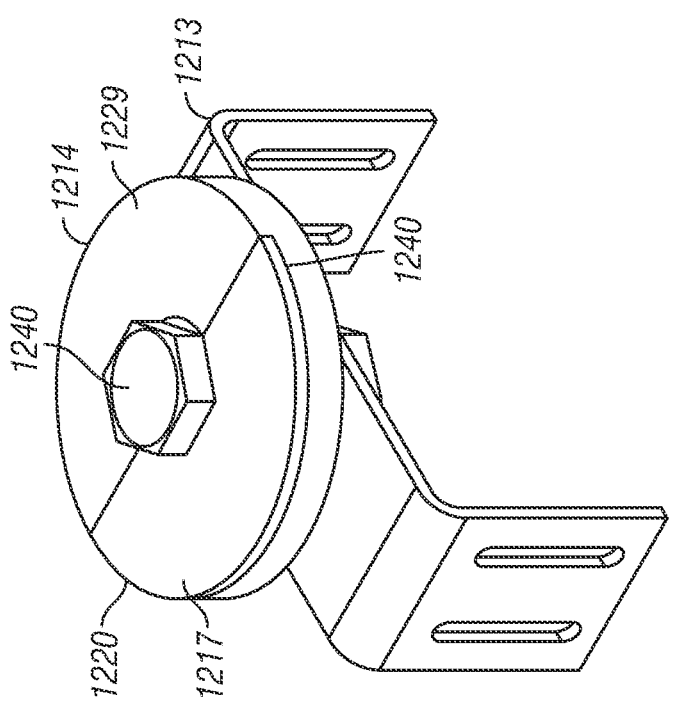

In some embodiments, common hardware or machines elements may be utilized, which may reduce overall complexity, reduce manufacturing costs, or other advantages. FIG. 12A depicts an exploded view of one embodiment in which common machine elements are used instead of custom-made hardware. FIGS. 12B and 12C depict embodiments in an assembled position ready to receive a disk assembly. In some embodiments, spring 1212 and hardware 1208 and 1220 may be common, off-the-shelf parts. In some embodiments, bracket 1213 or hardware 1215 may be able to replace portions of base assembly 250. In some embodiments, such as depicted in FIG. 12A, piston 1214 may include a single rib 1229 and a single notch 1216, alignment bushing 1220 may include a single radial arm 1217 and a single notch 1230, and disk assembly 300 may include tab 1207. Hardware 1240 may be used to couple portions together or to bracket 1213.

As those skilled in the art will appreciate after reading this disclosure, embodiments described herein provide many variations of elements but a common push and turn functionality, in which one or more tabs on the disk assembly may be captured by the base assembly to secure the disk assembly to the wheel.

In addition to wheel assemblies discussed above (and shown in FIGS. 1A and 1B), large vehicles may also have wheels mounted on a steer axle. FIG. 13 depicts a view of a single wheel assembly, such as found on steer axle 70. In this situation, mounting an aerodynamic wheel cover may differ due to the different depth or geometry of steer axle 70. FIGS. 14 and 15 further show hub odometer 1410 and oil level indicator 1510 which may be mounted on a wheel assembly and require further accommodation from wheel cover assembly 100.

FIGS. 16A-16D depict views of one embodiment of aerodynamic wheel cover assembly 100 useful for accommodating components mounted to hub 50 or for mounting to steer axle 70. An inner opening diameter of inner ring 202 may be selected to accommodate maintenance or inspection of components mounted to a hub without removal of the inner ring 202. An inner opening diameter of inner ring 202 may also attach to components typically mounted to the hub 50, such as a hub odometer. An advantage of mounting a hub odometer or other component to the inner opening diameter of the inner ring may allow embodiments to utilize all of the benefits disclosed herein. For example, embodiments may utilize a quick release mechanism for easier removal or access for inspections and maintenance.

Figure 16A:
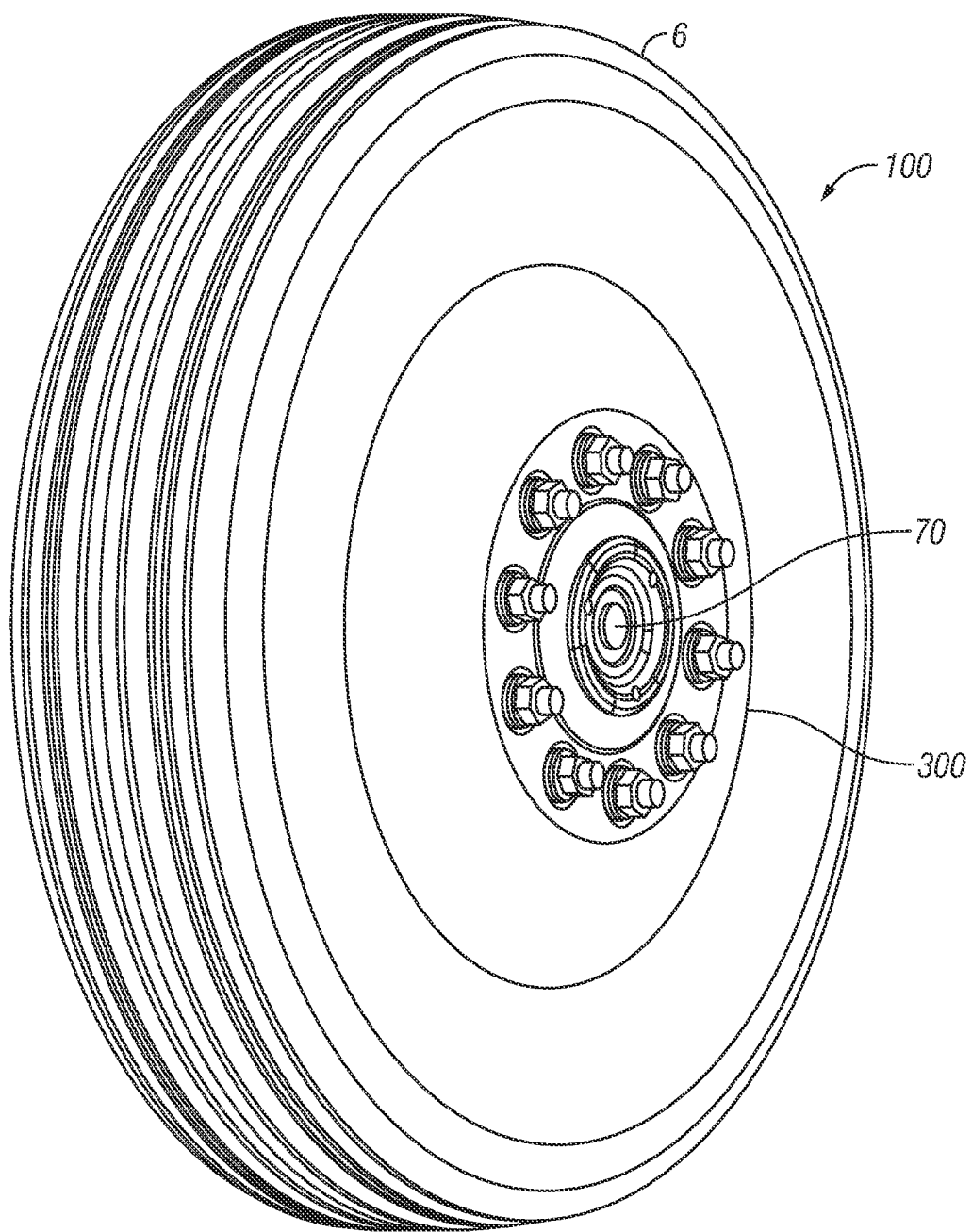
Figure 16B:
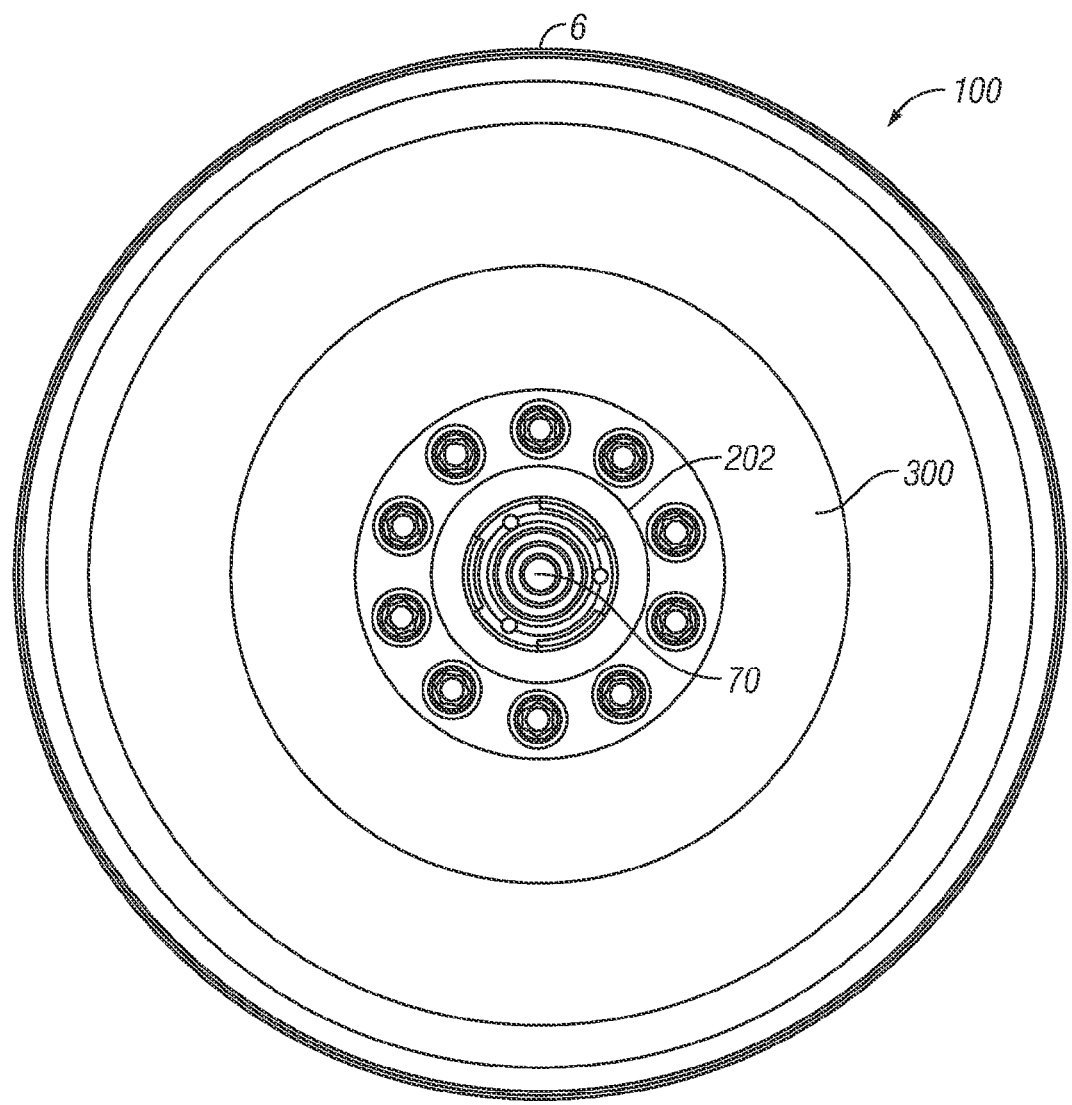

FIG. 16B depicts a side view of one embodiment of wheel cover assembly 100 mounted on wheel 6 having a component (e.g. steer axle 70) that obstructs positioning on a hub. Inner ring 202 may have a diameter sized to accommodate steer axle 70, hub odometer 1410, oil level indicator 1510, etc.

Figure 16C:
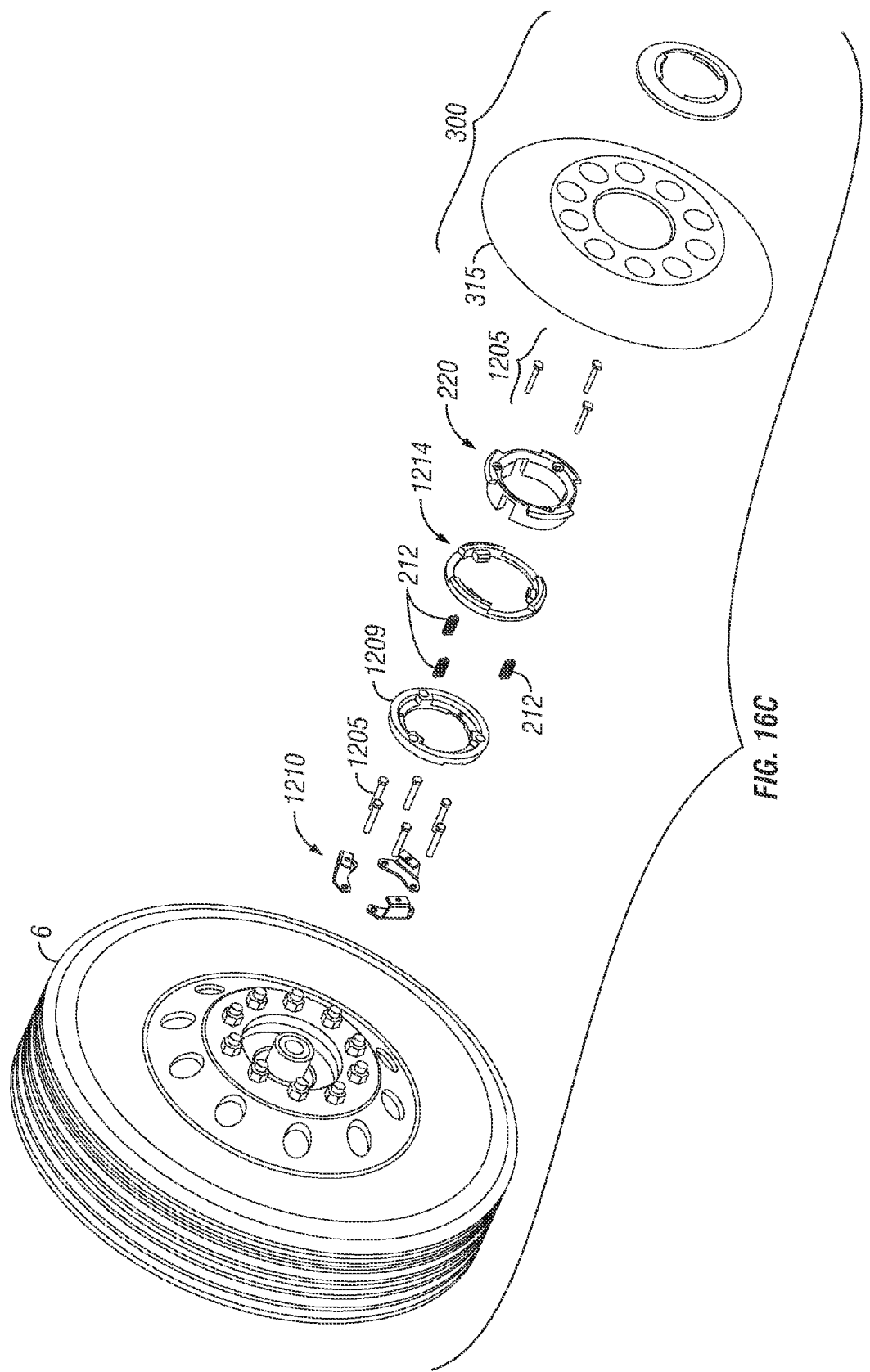

FIGS. 16C and 16D depict an exploded view of one embodiment of base assembly 250 showing bracket assembly 1210, base 1209, springs 212, piston 1214 and alignment bushing 1220, along with attachment hardware 1205. In some embodiments, piston 1214 may not include any central spokes to accommodate steer axle 70. Instead, piston 1214 may include partial spoke projections 1232 projecting radially inward some distance, leaving a large enough opening for components to pass. Spokes 1232 may be aligned with and positioned in channels 1231 to inhibit rotational movement of piston 1214. In such embodiments, a plurality of springs 1212 or other resilient members may be positioned to contact piston 1214 and used to maintain an outward bias on piston 1214 and avoid binding by piston 1214 in base 1209 or alignment bushing 1220. Operation of base assembly 250 may be similar to operation of base assembly 250 described above, in that tabs 207 on disk assembly 1300 may contact ribs 1229 on piston 1214, piston 1214 may be depressed from a first biased position to a second biased position such that tabs 207 may be rotated some angle until tabs 207 align with notches 1216 in piston 1214 and are positioned behind radial arms 1217, and tension on springs 212 may be released to allow piston 1214 to translate into a third biased position, locking tabs 207 (and thus disk assembly 1300) relative to wheel assembly 6.

An advantage to embodiments described herein may be the ability for the outer portion or edge of a disk assembly to maintain contact with a wheel. As depicted in FIGS. 2A-2B, 3A-3B, 16A and 16B, an outer edge or portion of disk assembly 300 or 1300 is maintained in contact with a rim of wheel assembly 6. Maintaining contact at an outer edge may prevent undesirable effects associated with vehicle vibration and air streams in contact with disk 300 or 310, such as noise or undue vibration, which may lessen any aerodynamic effect or undesirably wear components of the disk assembly 300. An outer edge or portion of the disk may be reinforced or provided with pads, or otherwise configured to dampen vibration and reduce wear associated with contact with a rim of wheel assembly 6.

Figure 17A:
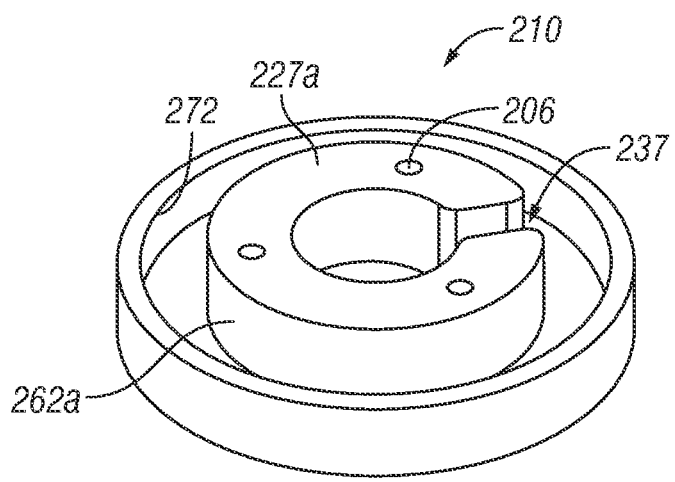
FIGS. 17A-17C depict views of alternative embodiments of a portion of a base assembly.
Figure 17B:
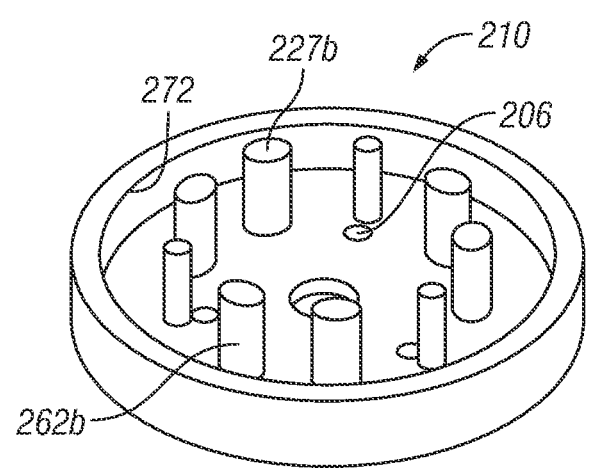
Figure 17C:
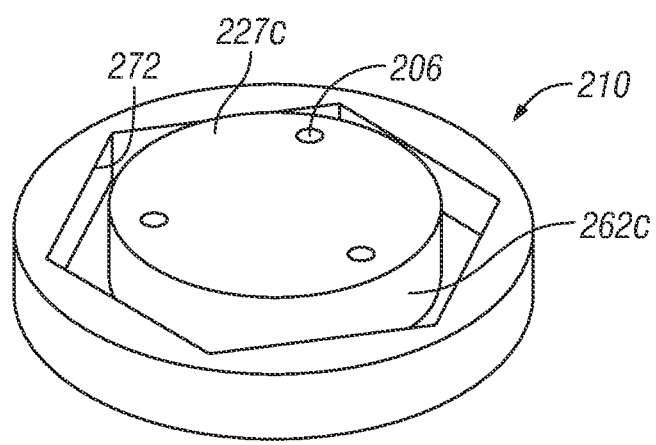

Variations of various components may be possible without varying from the scope of the disclosure. For example, FIGS. 17A-17C depict views of alternative embodiments of base 210. FIG. 17A depicts a perspective view of one embodiment of base 210 having one extension 227 with channel 237 formed therein. FIG. 17B depicts a perspective view of one alternative embodiment of base 210 having a plurality of various shaped extensions 227. Having different shaped extensions 227 may ensure that wheel cover assembly 100 is aligned in a particular orientation, enables locking, or some other advantage. FIG. 17C depicts a perspective view of one alternative embodiment of base 210, with inner wall 272 having sides. As shown in FIG. 17C, inner wall 272 may have six sides. However, those skilled in the art will appreciate that more or fewer sides may be possible.

In the foregoing specification, the invention has been described with reference to specific embodiments. However, one of ordinary skill in the art appreciates that various modifications and changes can be made without departing from the scope of the invention as set forth in the claims below.

Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A wheel cover system comprising:
   a bracket assembly configured to couple to a wheel;
   a disk assembly comprising an inner portion;
   a push and turn securing mechanism coupled to the bracket assembly and compatible with the inner portion of the disk assembly, wherein the disk assembly is removably coupled to the wheel by the push and turn securing mechanism and the push and turn securing mechanism is shaped to receive the disk assembly and allow the disk assembly to rotate a fraction of a single rotation to a secured position.

2. The wheel cover system of claim 1, wherein the inner portion of the disk assembly comprises a metal ring.

3. The wheel cover system of claim 1, wherein the disk assembly comprises a disk formed from a resilient material.

4. The wheel cover system of claim 1, wherein the bracket assembly is an adjustable bracket.

5. The wheel cover system of claim 1, wherein the push and turn mechanism comprises:
   a base having an inner wall;
   a translatable piston for positioning in the inner wall, having an outboard side formed with one or more ribs and one or more notches;
   at least one spring having a first end biased by the base and a second end biasing the piston; and
   an alignment bushing having one or more arms and one or more notches.

6. A wheel cover system comprising:
   a bracket assembly assembled to couple to a wheel;
   a securing mechanism comprising:
   a piston translatable along a rotational axis of a wheel;
   one or more retaining members coupled to the piston;
   a disk assembly having an inner portion, wherein the inner portion and one or more retaining members are configured such that the inner portion is translatable along the rotational axis of the wheel when the inner portion is in a first rotational position relative to the one or more retaining members and the inner portion is rotatable by a fraction of a single rotation to a secured position.

7. The wheel cover system of claim 6, wherein the piston is translatable in a base having an inner wall, wherein the securing mechanism further comprises a spring having a first end in contact with the base and a second end in contact with the piston.

8. The wheel cover system of claim 6, wherein the disk assembly comprises:
   an inner ring having a plurality of tabs; and
   an outer ring,
   wherein the securing mechanism further comprises a base assembly comprising:
   a base having an inner wall having a plurality of extensions separated by a plurality of channels, wherein the piston is at least partially received in the base, the outboard side formed with a plurality of ribs separated by a plurality of notches;
   one or more spokes, each spoke having a width less than an arc length between adjacent extensions, the plurality of spokes positioned between the extensions; and
   a spring having a first end in contact with the base and a second end in contact with the piston;
   wherein the plurality of tabs are translatable in a direction substantially parallel to a longitudinal axis of the piston to a first position, whereby the spring is deflectable relative to the longitudinal axis,
   wherein the plurality of tabs are rotatable about the longitudinal axis to a second position, whereby force applied by the spring maintains the plurality of tabs between the plurality of ribs.

9. The wheel cover system of claim 8, wherein the disk assembly comprises a resilient disk.

10. The wheel cover system of claim 8, wherein the piston has a shape complementary to the shape of the inner wall or the extensions.

11. A quick-release latch assembly for a vehicle wheel, comprising:
    a bracket assembly configured to couple to a wheel;
    a base assembly for coupling with the bracket assembly, the base assembly comprising:
    a base having an inner wall;
    a translatable piston for positioning in the inner wall, comprising:
    an outboard side formed with one or more ribs and one or more notches; and
    at least one spring having a first end biased by the base and a second end biasing the piston;
    an alignment bushing having one or more arms and one or more notches; and
    a disk assembly compatible with the base assembly comprising:
    an inner ring having one or more tabs;
    a resilient disk;
    wherein one or more tabs are translatable in a direction substantially parallel to a longitudinal axis of the piston to a first position,
    wherein the one or more tabs are rotatable about the longitudinal axis to a second position, whereby force applied by the spring maintains the second position.

12. The latch assembly of claim 11, wherein the inner ring comprises a metal ring.

13. The latch assembly of claim 12, wherein the inner ring is formed with a thickness greater than a thickness of the resilient disk.

14. The latch assembly of claim 11, wherein the piston comprises:
    an inner shaft, wherein a plurality of spokes connect the inner shaft to an outer ring of the piston and wherein depression of the inner shaft depresses the spring in the piston.

15. The latch assembly of claim 11, wherein one or more of the base, the piston and the resilient disk are formed from ABS plastic.

16. The latch assembly of claim 11, wherein the inner ring is machined from steel.

17. The latch assembly of claim 11, wherein axial extensions are formed on the base or the piston.

18. The latch assembly of claim 11, wherein the piston further includes an inner shaft coupled to an outer ring by a plurality of spokes.

19. The latch assembly of claim 11, wherein the disk assembly comprises a disk formed from a resilient material.

20. The wheel cover system of claim 1, wherein the disk assembly is radially vented.

21. The wheel cover system of claim 1, wherein the disk assembly is formed from a clear material to allow a view of a component of the wheel.

22. The wheel cover system of claim 1, wherein the inner portion of the rim may be exposed while the disk assembly is in a secured position.

23. The wheel cover system of claim 1, wherein the disk assembly has one or more insets to assist in removal or installation of the disk assembly.

* * * * *